Sept. 14, 1965  E. J. McGRATH  3,206,041
ARTICLE HANDLING APPARATUS
Filed June 18, 1959  17 Sheets-Sheet 1
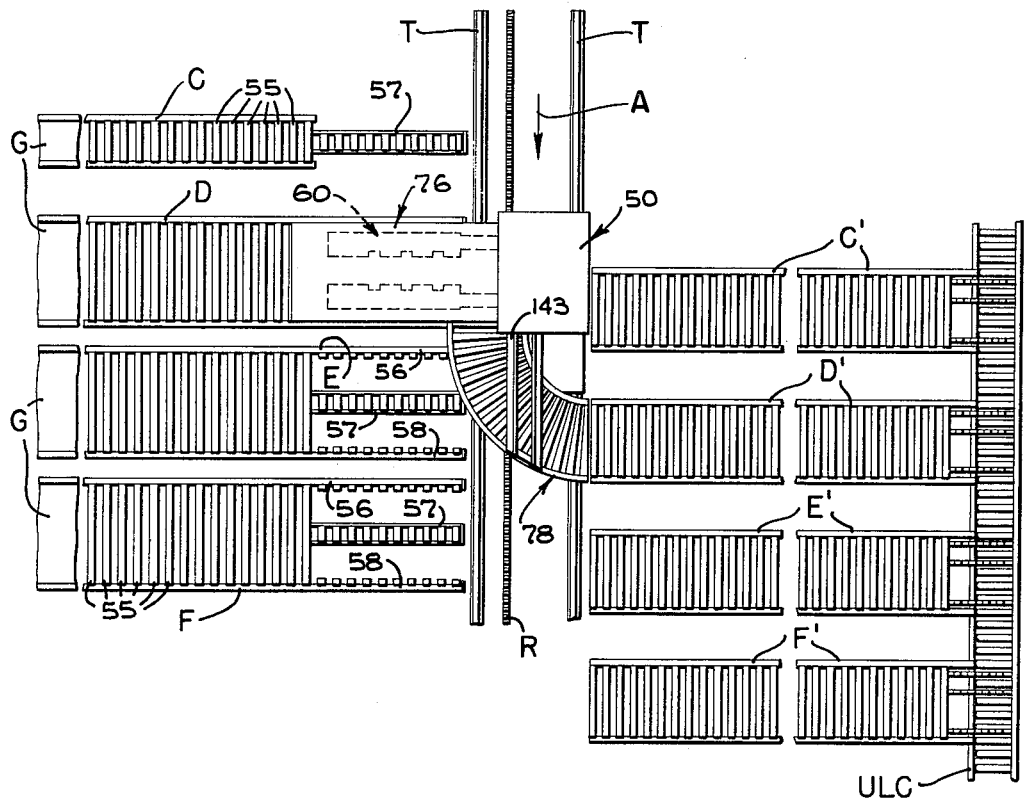
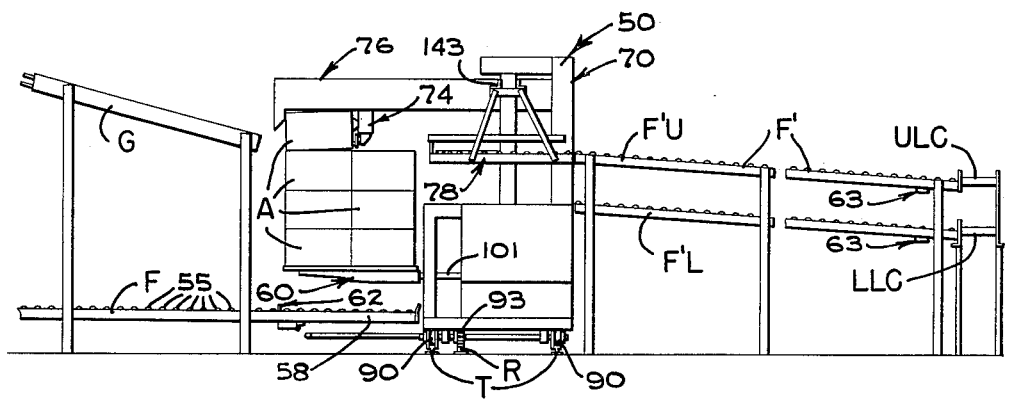
INVENTOR
EARLE J. MC GRATH
BY
ATTORNEY

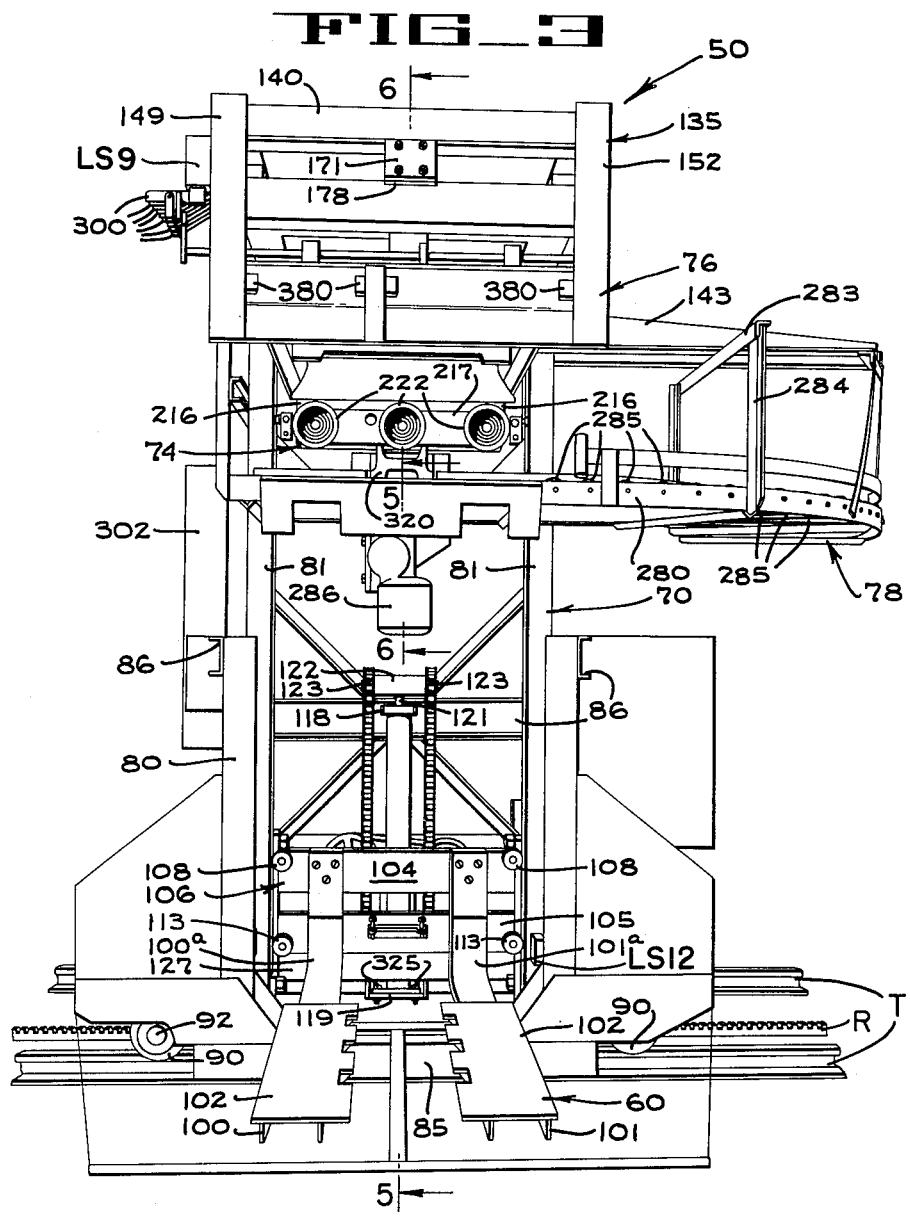

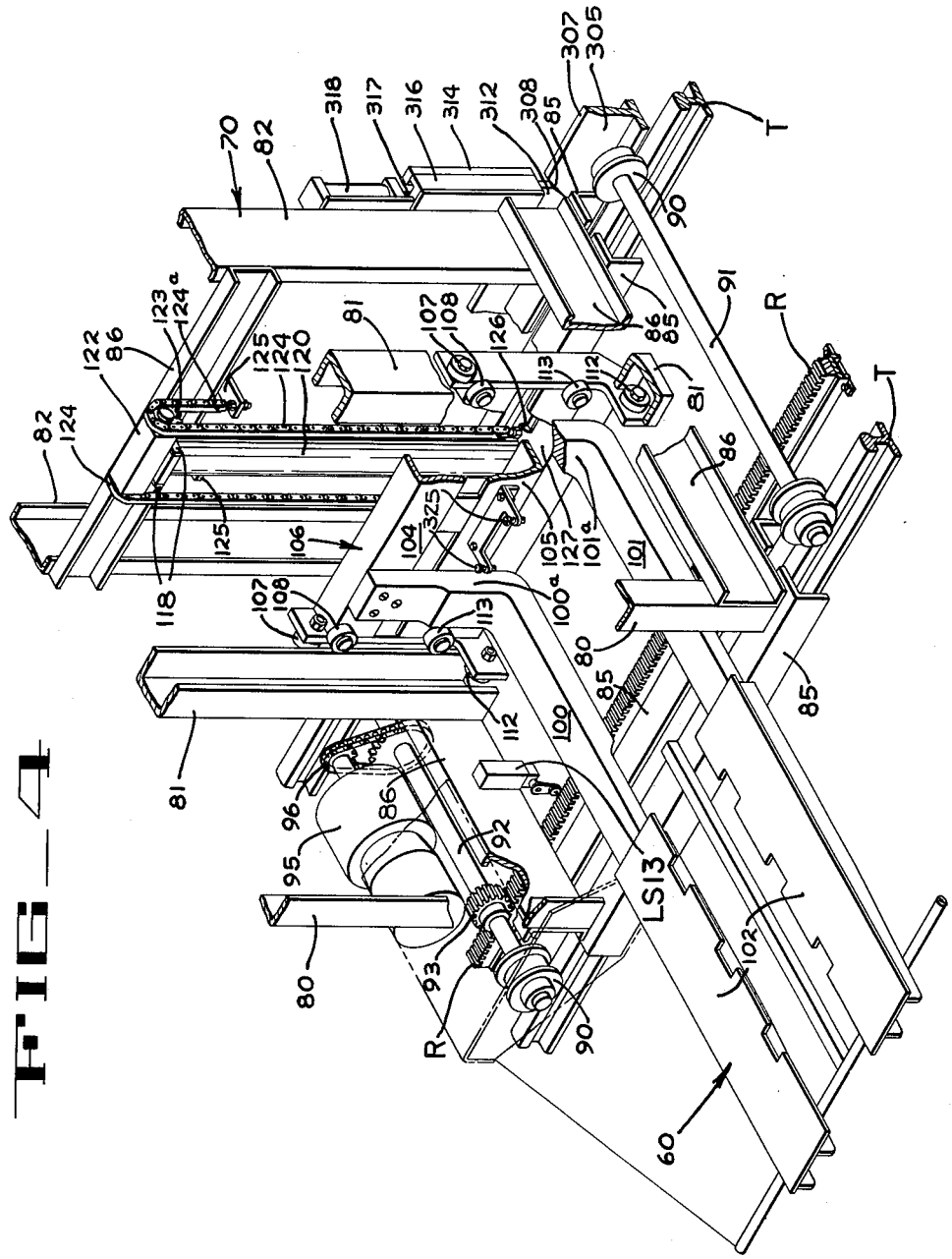

Sept. 14, 1965    E. J. McGRATH    3,206,041
ARTICLE HANDLING APPARATUS
Filed June 18, 1959    17 Sheets-Sheet 4
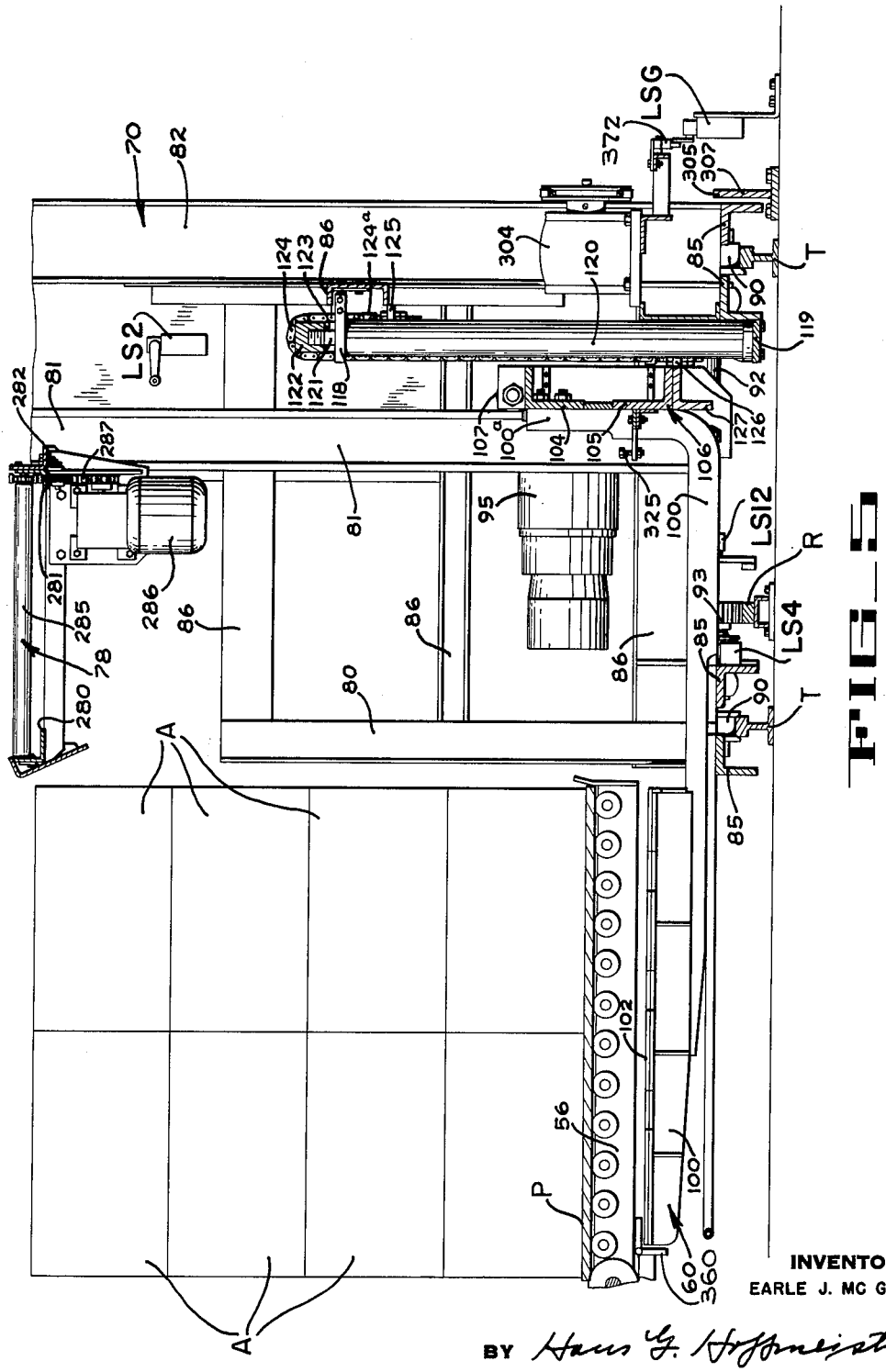
INVENTOR
EARLE J. MC GRATH
BY *Hans G. Hofmeister*
ATTORNEY

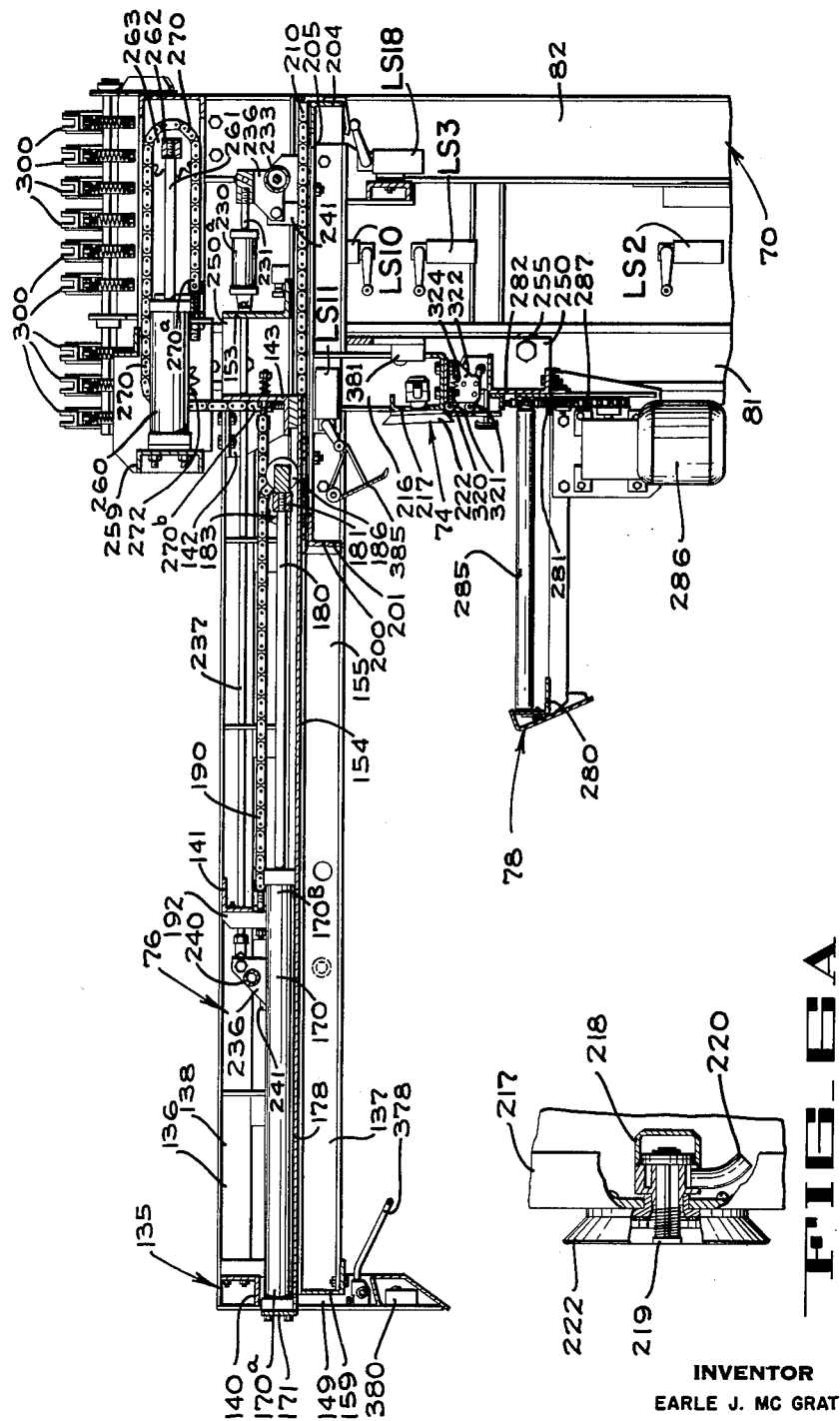

Sept. 14, 1965  E. J. McGRATH  3,206,041
ARTICLE HANDLING APPARATUS
Filed June 18, 1959  17 Sheets-Sheet 6
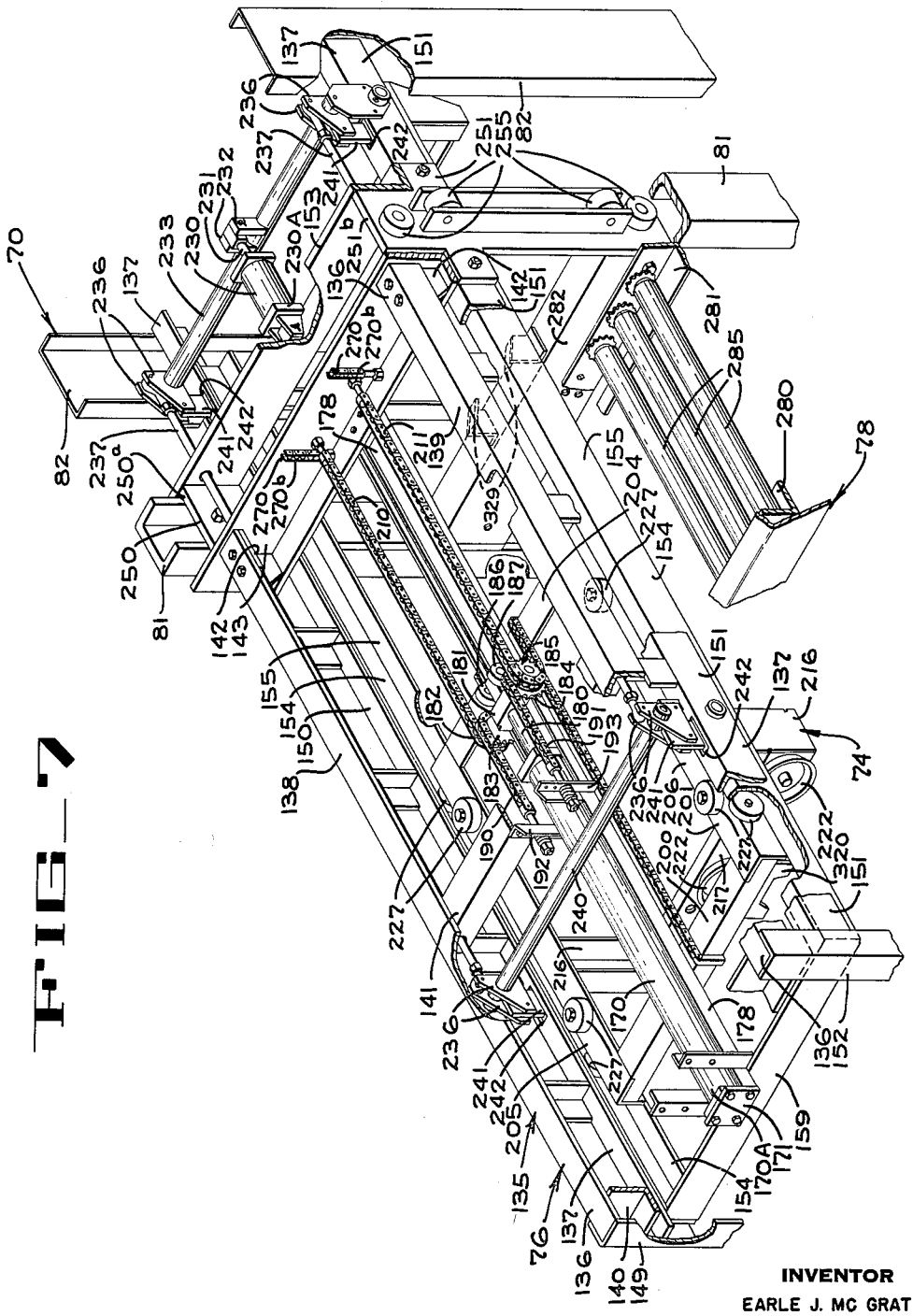
INVENTOR
EARLE J. MC GRATH
BY Hans G. Hoffmeister
ATTORNEY

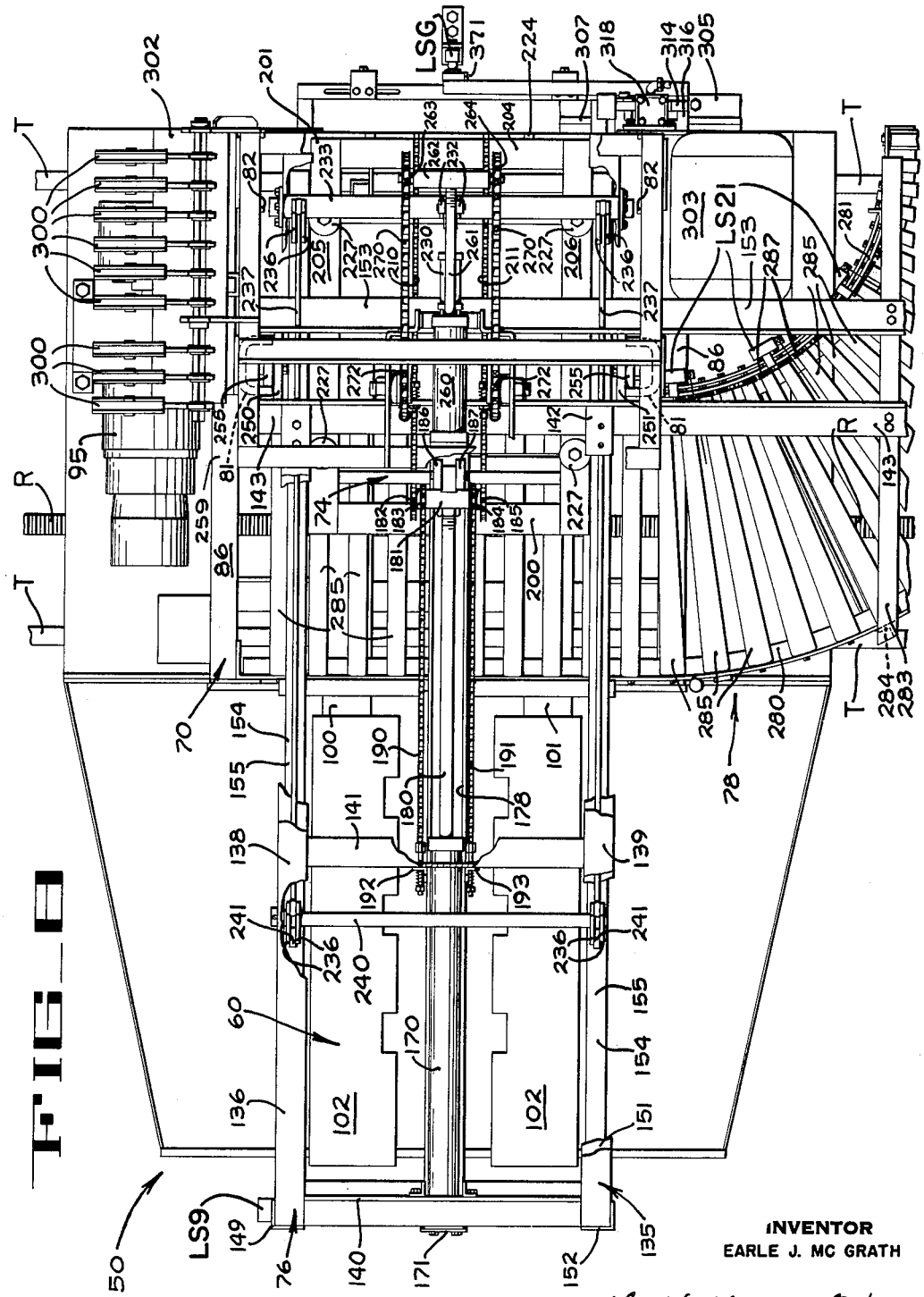

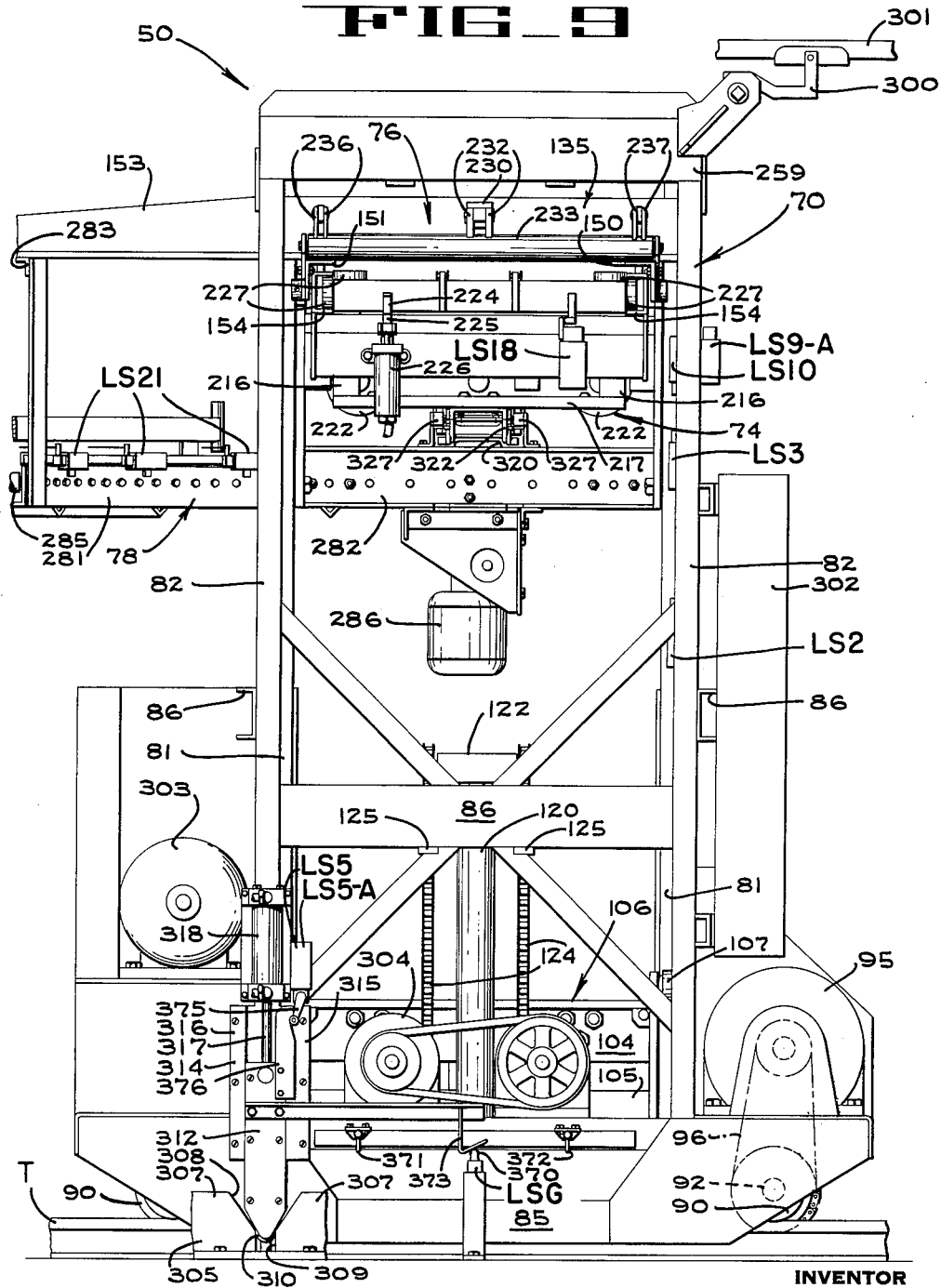

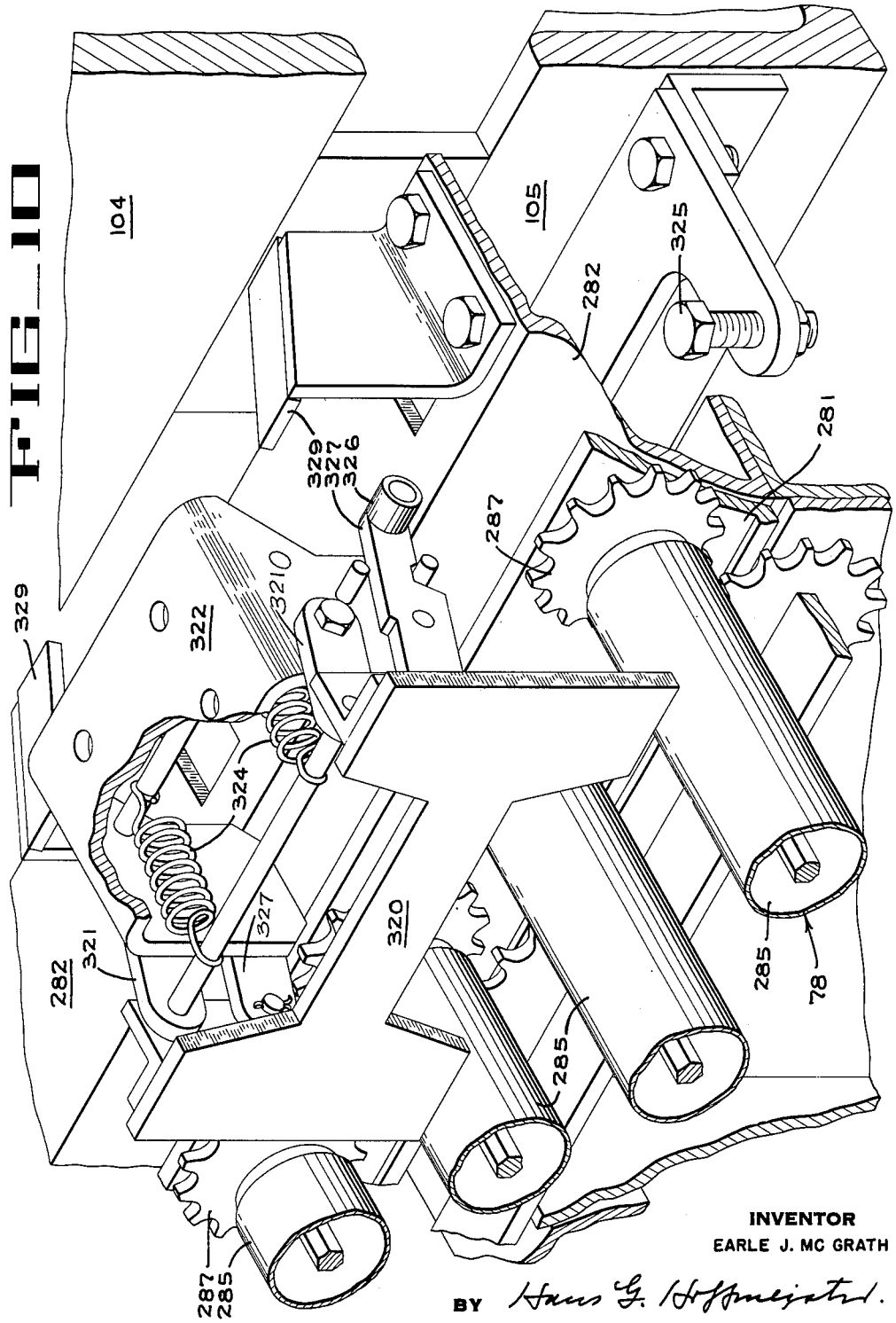

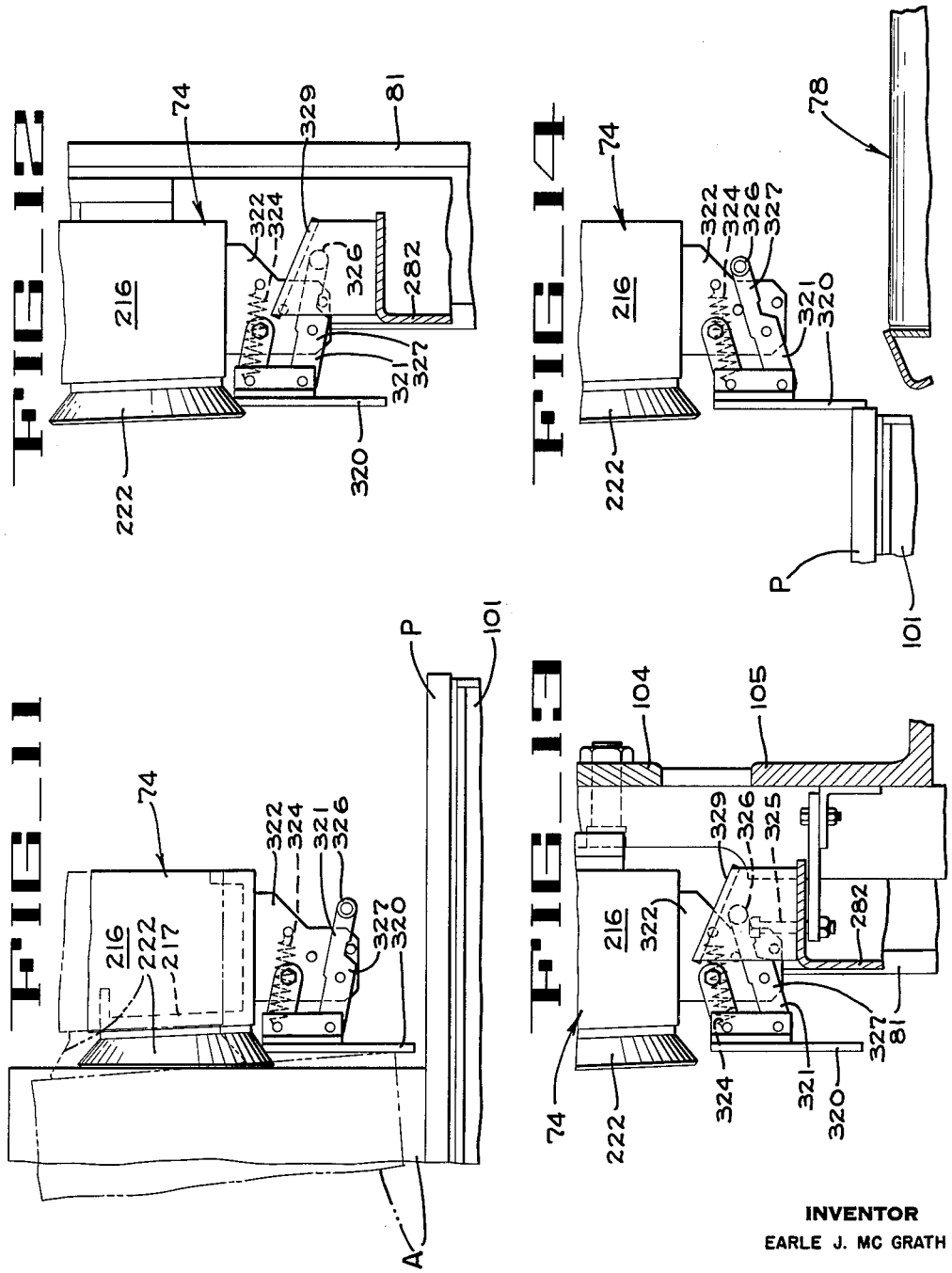

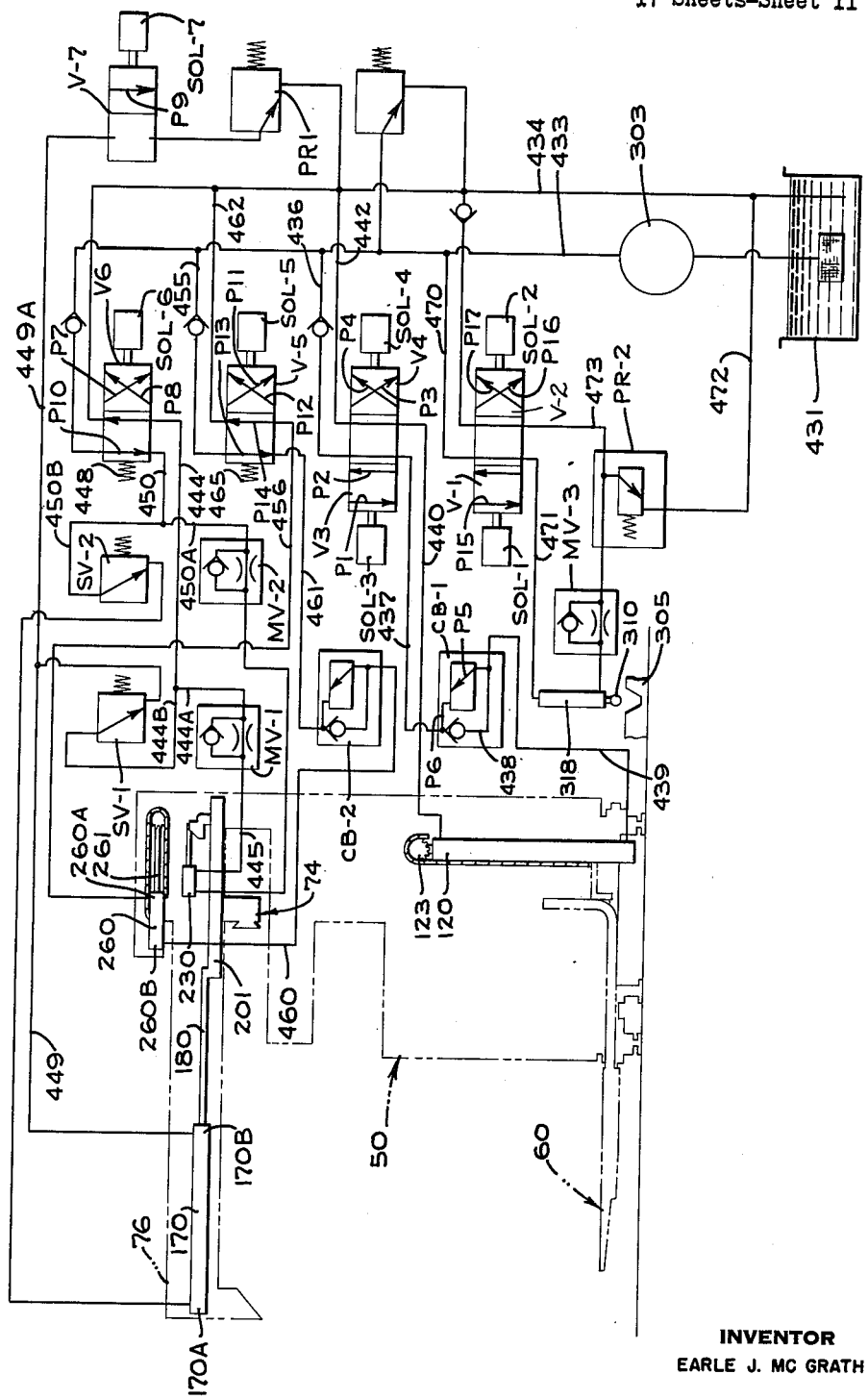

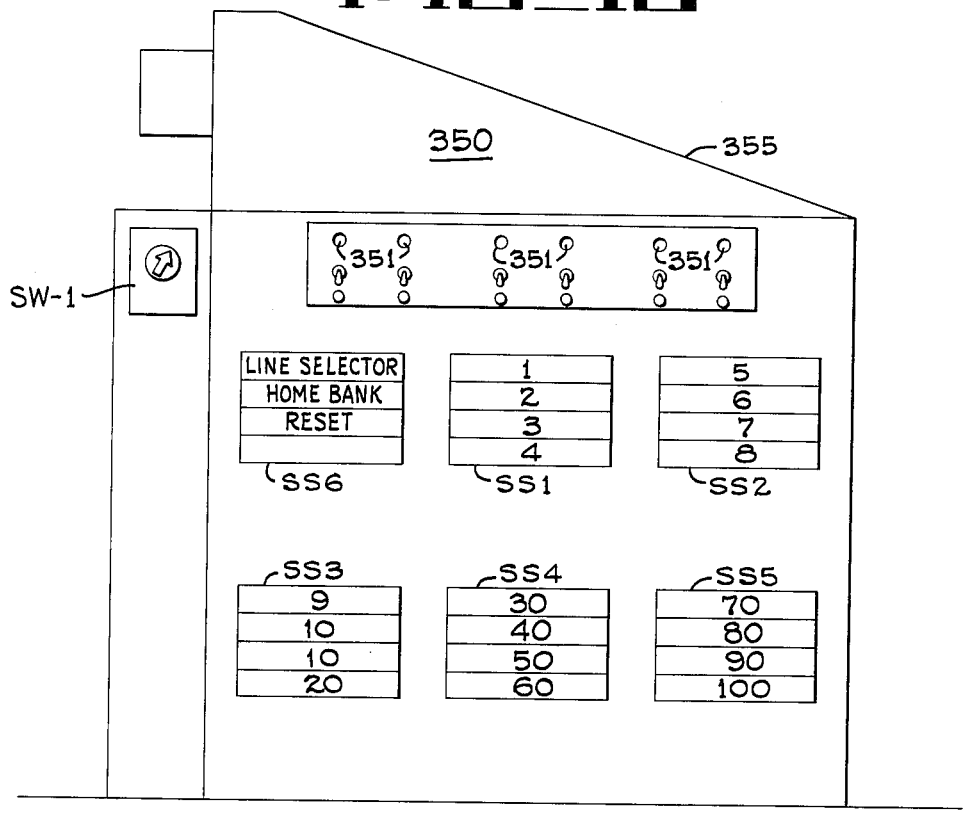
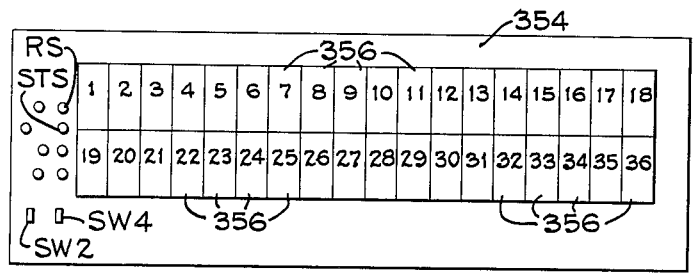
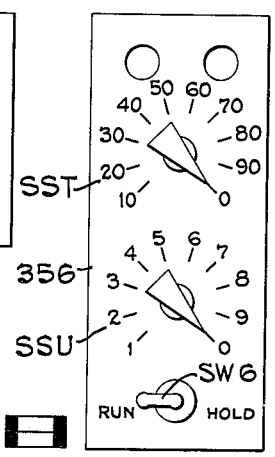

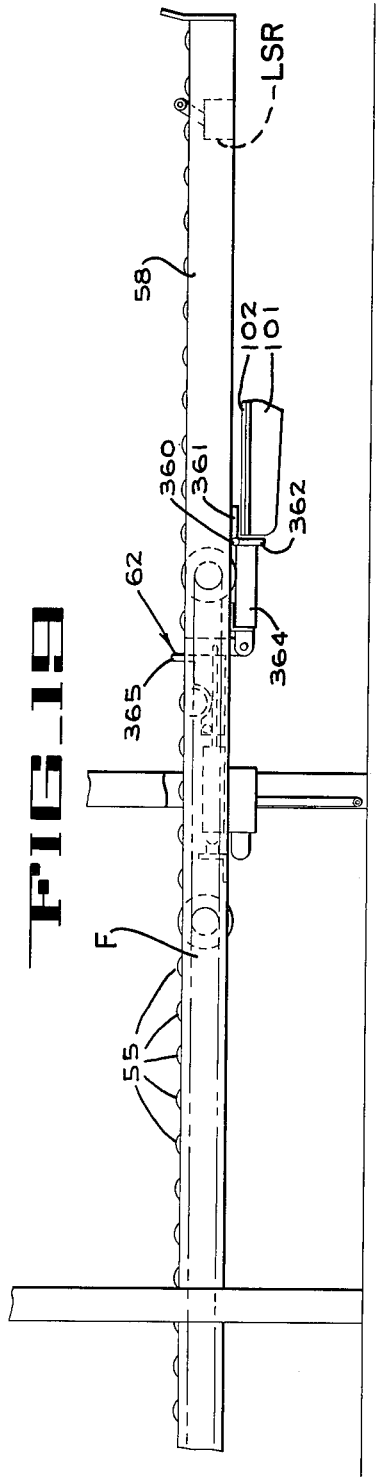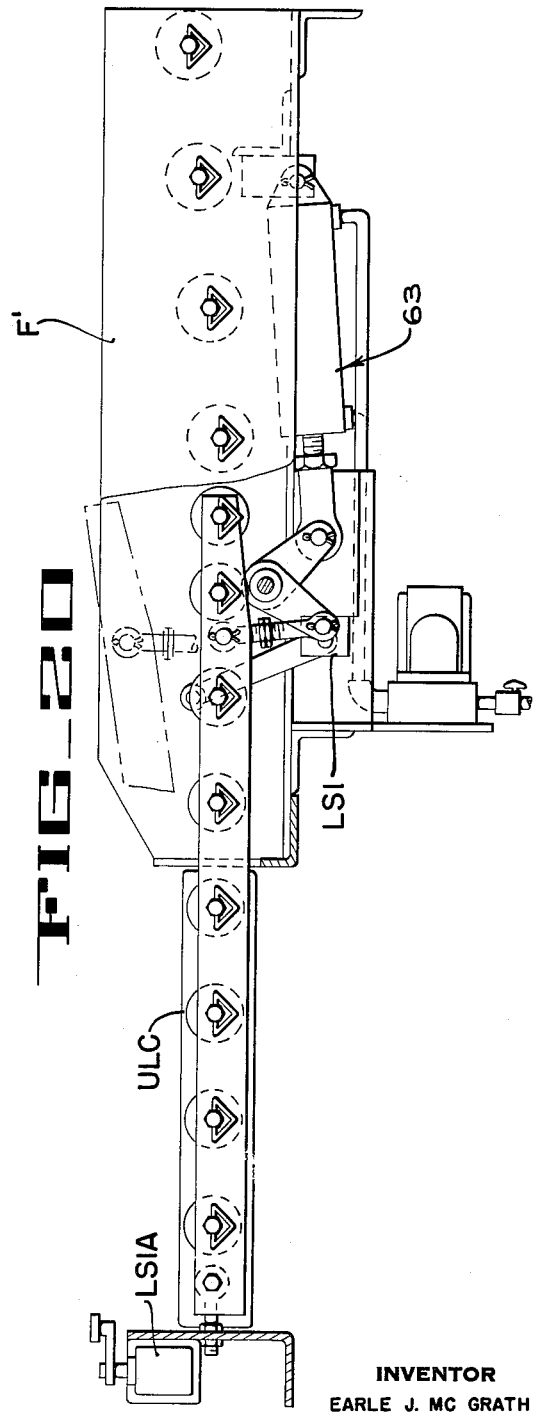

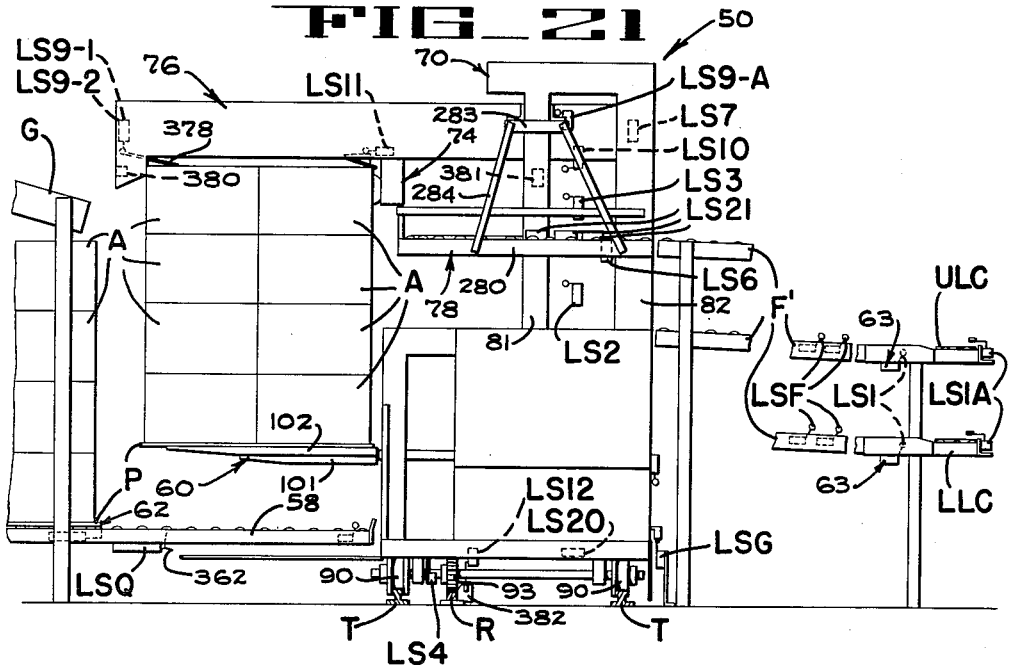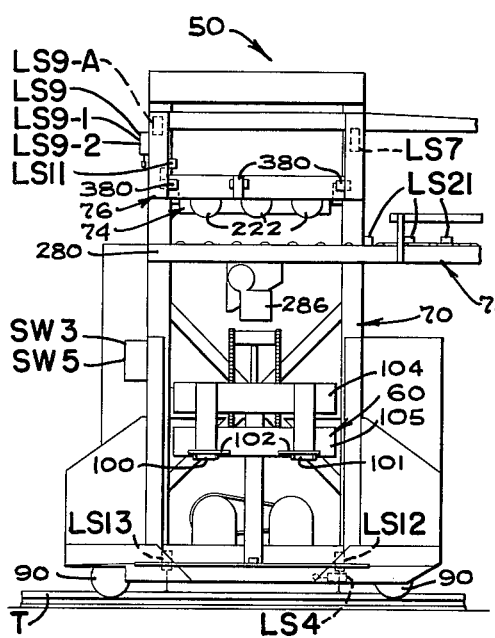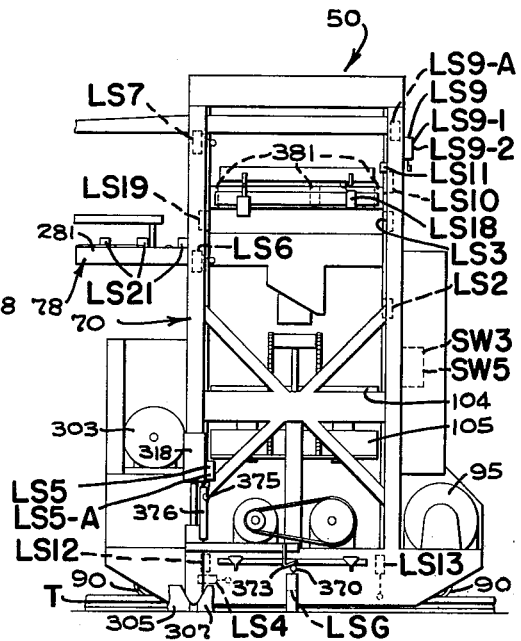

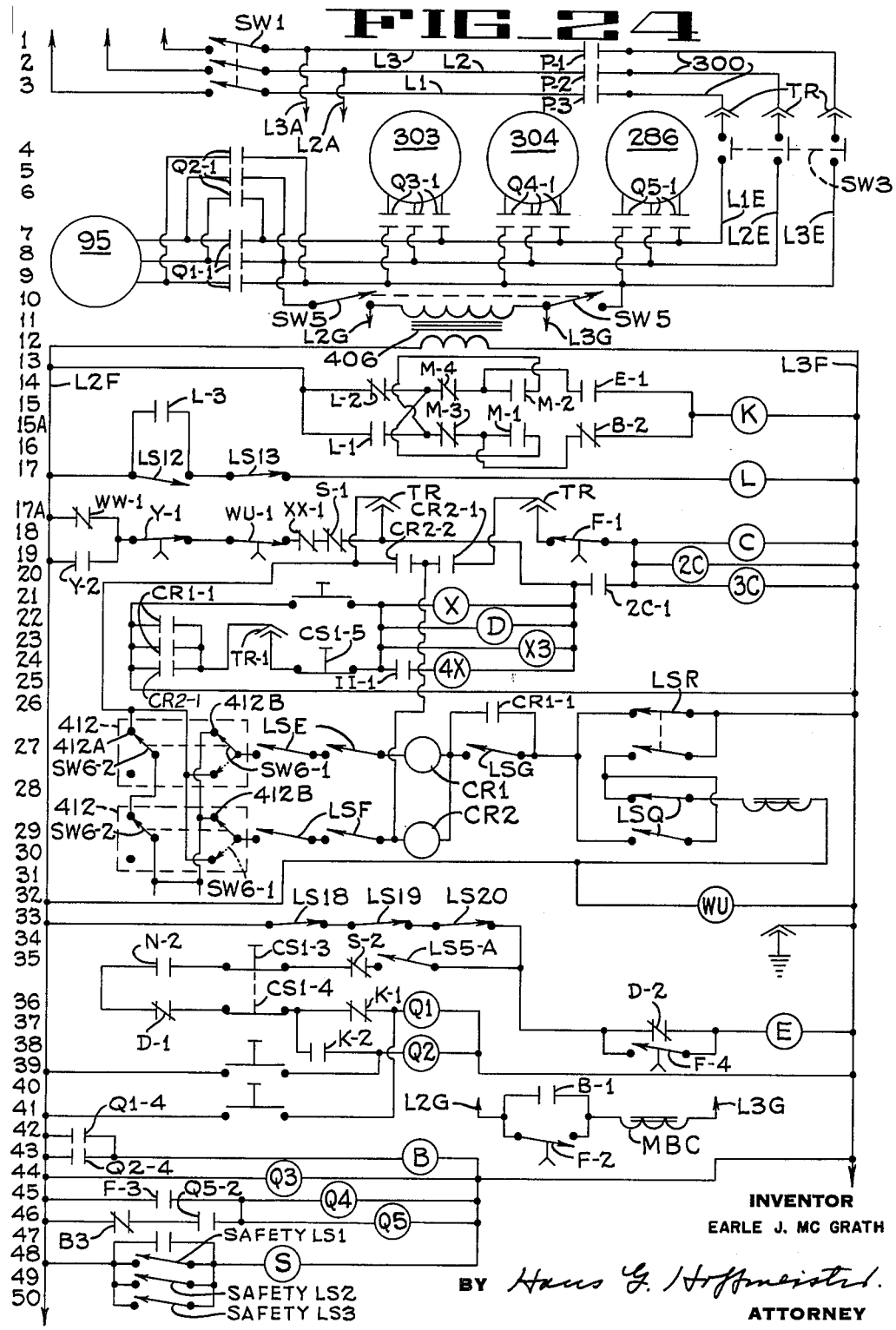

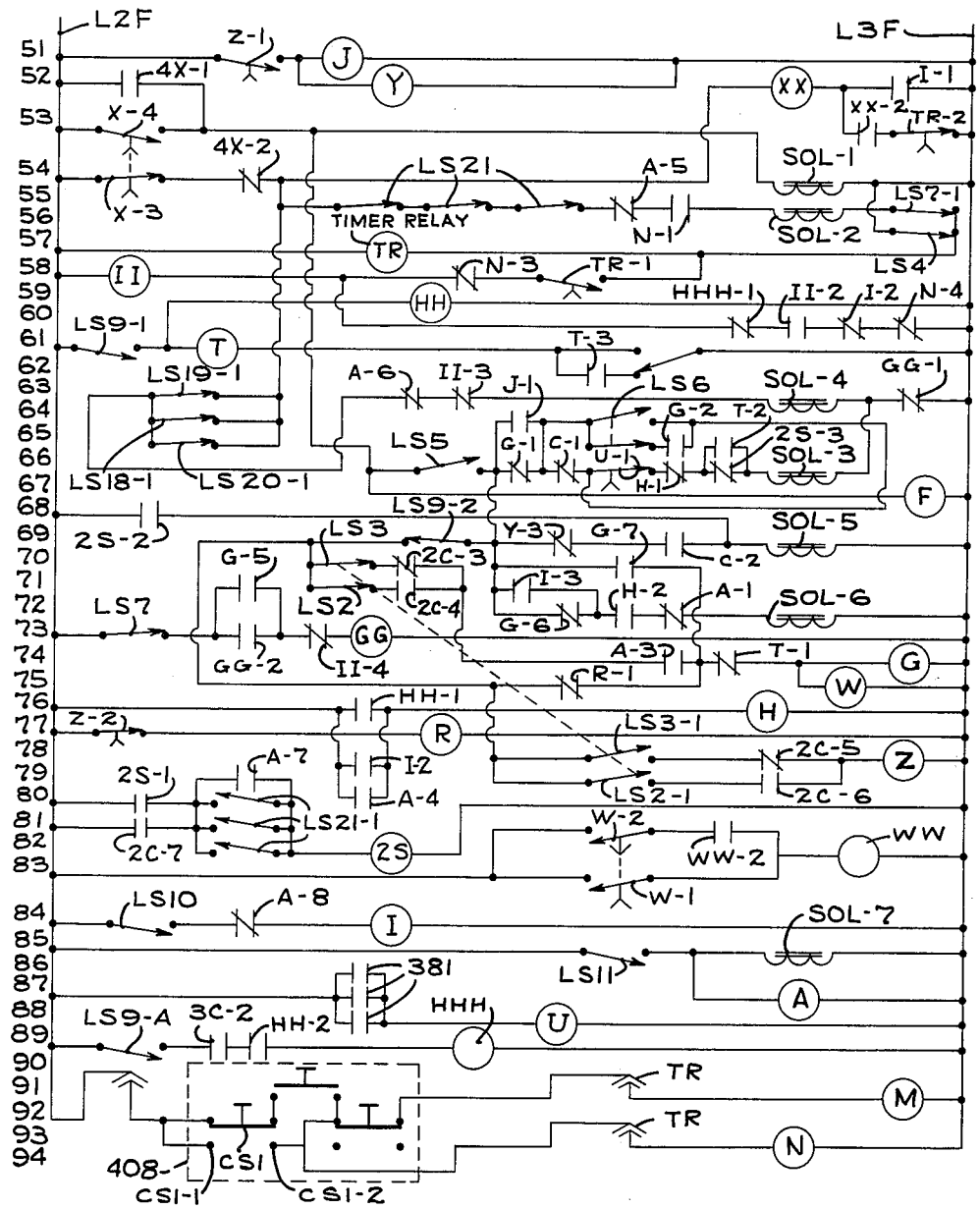
FIG_25

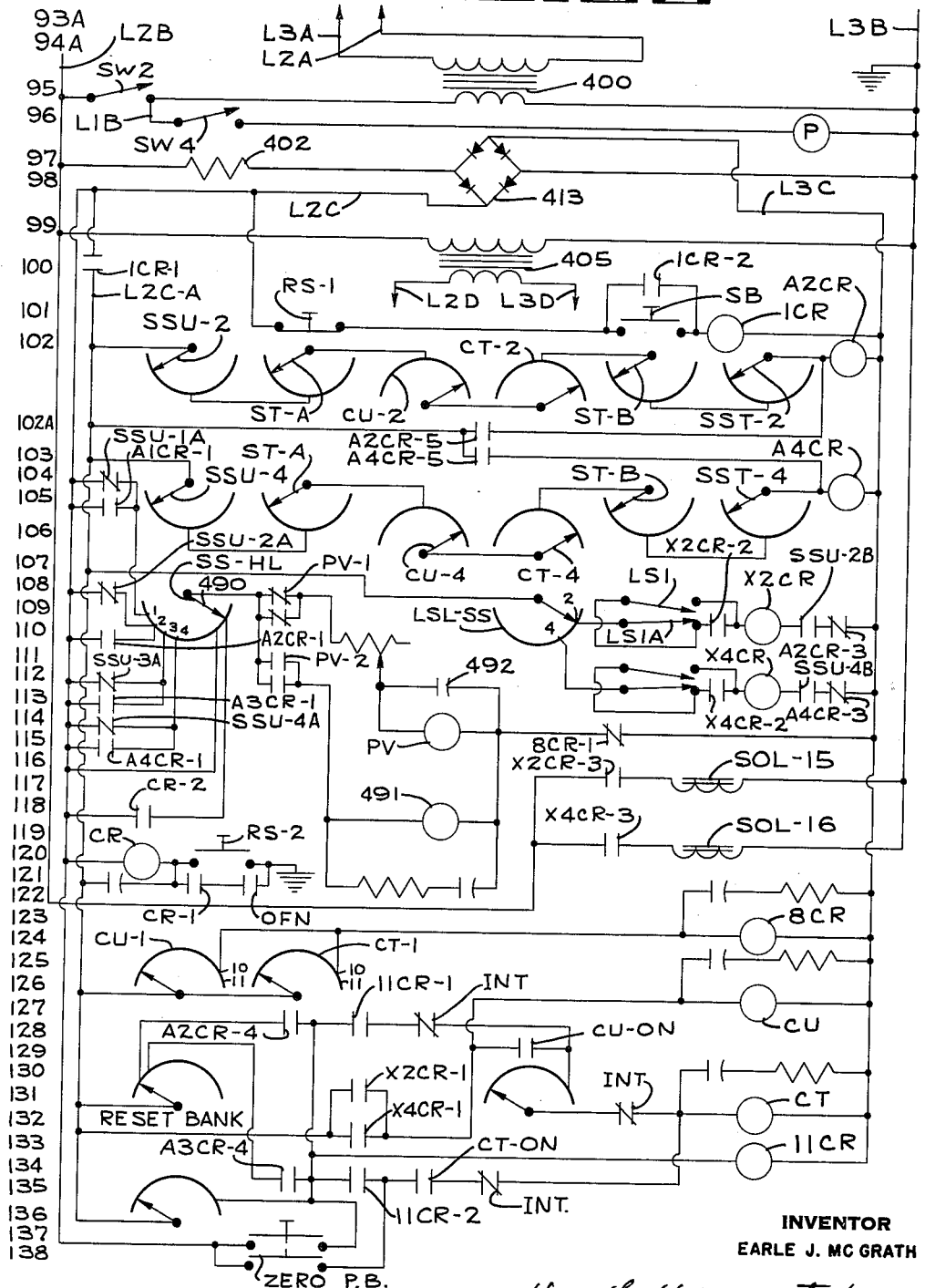

United States Patent Office 3,206,041
Patented Sept. 14, 1965

3,206,041
ARTICLE HANDLING APPARATUS
Earle J. McGrath, San Bernardino, Calif., assignor to FMC Corporation, a corporation of Delaware
Filed June 18, 1959, Ser. No. 821,326
4 Claims. (Cl. 214—8.5)

This invention pertains to article handling apparatus and more particularly relates to an improved article distribution system and improved apparatus for automatically distributing desired quantities of articles from a plurality of storage facilities each of which contains articles of a particular classification.

This application is a continuation-in-part of my pending application Serial No. 809,704 filed April 29, 1959, now abandoned, and which, in turn, is a continuation-in-part of my application Serial No. 747,695, filed July 10, 1958, now Patent No. 3,027,023.

It is usual practice for wholesalers or distributors to maintain large warehouses where supplies of various items are stored. When an order is received for a quantity of articles of several different classes or grades, it is necessary for an order picker to manually accumulate articles of each class and deliver them to the loading zone. Care must be exercised to maintain each class of article separately so that the order can be efficiently checked at the loading zone. Such manual order picking and checking is time consuming and expensive.

It is an object of the present invention to provide an article distributing system which is capable of automatically selecting desired quantities of each class of article and delivering them to a loading zone in a predetermined order which facilitates checking and loading.

Another object is to provide an improved pallet unloading mechanism.

Another object is to provide efficient conveyor means for a warehousing system.

Another object is to provide a pallet unloading machine capable of selectively servicing any one of a plurality of supply stations.

Another object is to provide an improved control mechanism for a warehousing system.

Another object is to provide an improved fork lift mechanism for an article handling machine.

Another object is to provide a pallet pushing mechanism for a pallet unloading machine.

Another object is to provide an efficient suction head for an article handling machine.

Another object is to provide a boom for an article handling machine that is capable of being adjusted to various operating levels.

Other and further objects and advantages of the present invention will become apparent from the following description taken in connection with the accompanying drawings, in which:

FIGURE 1 is a fragmentary diagrammatic plan of the article distributing system of the present invention.

FIGURE 2 is a side elevation of the system of FIG. 1.

FIGURE 3 is a perspective of the article handling machine used in the system of FIG. 1, the view being taken looking at the front of the machine and showing the machine on tracks.

FIGURE 4 is a fragmentary perspective of the lower portion of the machine of FIG. 3, parts of the machine being omitted or broken away to more clearly disclose certain structural features.

FIGURE 5 is an enlarged vertical section taken on line 5—5 of FIG. 3.

FIGURE 6 is an enlarged vertical section taken on line 6—6 of FIG. 3.

FIGURE 6A is an enlarged view, partly broken away, of a suction cup used in the machine of the present invention.

FIGURE 7 is a fragmentary perspective of the upper portion of the article handling machine with parts broken away to disclose certain operating mechanisms.

FIGURE 8 is a plan, partly broken away, of the article handling machine of the present invention.

FIGURE 9 is a rear elevation of the article handling machine of the present invention.

FIGURE 10 is an enlarged perspective, with parts broken away, of the pallet pushing mechanism of the present invention.

FIGURES 11, 12, 13 and 14 are fragmentary diagrammatic operational views showing different operating positions of the pallet pushing mechanism of the present invention.

FIGURE 15 is a diagram of the hydraulic control system used in the machine of the present invention.

FIGURE 16 is a side elevation of a console by which the depalletizer may be controlled.

FIGURE 17 is a plan of a control panel mounted on the console of FIG. 16.

FIGURE 18 is a plan of one of the selector units mounted in the panel of FIG. 17.

FIGURE 19 is a fragmentary view of the discharge end of one of the conveyors used to bring loaded pallets to a position adjacent the depalletizer.

FIGURE 20 is a side elevation, partly broken away, showing a truck loading conveyor and the mechanism at the end of one of the order picking conveyors which controls the discharge of cases onto the truck loading conveyor.

FIGURE 21 is a diagrammatic side elevation of the depalletizer of the present invention and the associated supply and order picking conveyors, particularly showing the location of the electrical control switches.

FIGURES 22 and 23 are diagrammatic front and rear elevations of the depalletizer.

FIGURES 24, 25 and 26 are diagrams which, when aligned one above the other, illustrate the electrical control circuits used in the machine of the present invention.

In the article unloading or distributing system of the present invention, an unloading or depalletizing machine 50 (FIGS. 1 and 2) is arranged to move back and forth on tracks T to remove a pellet P loaded with articles A from any one of a plurality of supply conveyors C, D, E or F, remove the articles one line at a time from the uppermost layer of articles on the pallet and deliver the articles to a discharge, or order picking conveyors C', D', E', or F', each of which is associated with the supply conveyor bearing the same reference letter C, D, E or F. Also, the machine 50 is capable of delivering articles to each discharge conveyor, as for example, conveyor F' at either an upper level F'U (FIG. 2) or a lower level F'L. When the last layer of articles has been removed from the pallet P, the machine pushes the pallet onto an overhead pallet removal conveyor G (FIG. 2), one of which is mounted above each supply conveyor C, D, E and F.

All of the upper levels of the discharge conveyors are arranged to deliver articles one by one onto an upper truck loading conveyor ULC while each lower level of the discharge conveyors delivers articles to a lower loading conveyor LLC, said loading conveyors being adapted to carry the articles to a loading station where the articles are loaded onto trucks or the like.

The article distributing system of the present invention is particularly adapted for use in a warehousing installation where a retailer brings his truck to the loading station and places an order for a number of articles of each of several different classes or grades. In an exemplary arrangement which will be referred to hereinafter in describing the invention, each of the supply conveyors C, D, E and F are adapted to handle pallets loaded with cases of eggs, the eggs handled on each conveyor being of a different grade than the eggs handled by the other conveyors.

The supply conveyors C, D, E, and F may be of the controlled gravity type disclosed in the copending application of Earle J. McGrath, Serial No. 747,762, filed July 10, 1958, now Patent No. 3,017,007. In this type of conveyor, each loaded pallet is progressively moved toward the discharge end of the conveyor on rollers 55. At the end of the conveyor, the pallet is supported on three spaced conveyor roller sections 56, 57, and 58 which permit the arms of a fork lift mechanism 60 of the machine 50 to be positioned under the pallet. It is to be noted that the conveyor C is illustrated as being adapted to handle ⅓ size pallets and, accordingly has only a center roller section 57 at its discharge end. Each supply conveyor is provided with a mechanism 62 which prevents the second loaded pallet from entering the unloading zone while the first pallet is held in the zone.

The empty pallet removal conveyors G may be of any well known power-driven roller or belt type suitable for handling pallets. It is to be noted that, in the present system, the pallets P may simply be flat boards of plywood or the like.

The tracks T are standard steel rails of the type universally used to provide a fixed runway for cranes, hoists and the like. Similarly, a heavy steel rack R of standard design is secured to the floor, or foundation, of the warehouse between the tracks T.

The discharge conveyors C', D', E' and F' may be of the power-drive roller type, and each of these conveyors is provided with a control mechanism 63, to be described hereinafter, that is effective to control the discharge of articles onto the truck loading conveyors ULC or LLC and to cause the machine 50 to deliver more articles to the discharge or order picking conveyor when the supply thereon reaches a predetermined minimum amount such as 18 cases of eggs.

In general, the machine 50 comprises a rigid frame support structure 70 (FIG. 2) and the fork mechanism 60 which is mounted for vertical movement in the frame 70 to intermittently raise the loaded pallet P upwardly to present an upper layer of articles to a suction head 74 which reciprocates in a horizontal boom 76. The suction head 74 is arranged to grip an entire line of articles in the top layer, draw them rearwardly and deposit them on a power-driven curved roller conveyor 78 (FIG. 1) that is mounted on the boom 76 and is adapted to carry the articles to whichever discharge conveyor is in alignment therewith at the time. The boom 76 is mounted for vertical movement on the frame 70 so that articles can be removed from the pallet and delivered to either the upper or the lower levels of the discharge conveyors.

The frame support structure 70 (FIGS. 3 and 4) of the machine comprises two vertical angle bars 80, two deep channels 81, and two shallow channels 82. These vertical members are connected by a plurality of horizontally disposed angle bars 85 and channels 86 to form a rigid structure.

The machine has four wheels 90 (three only being shown in FIG. 4) two of which are keyed to a shaft 91 and two of which are keyed to a drive shaft 92 which carries a pinion 93 in mesh with the fixed rack R. The shaft 92 is driven by a motor 95 through a chain and sprocket drive 96. The shafts 91 and 92 are journalled in rigid members (not shown) of the frame 70 so that movement of shaft 92, due to its engagement with the rack R, causes movement of the machine 50 along the tracks.

The fork lift mechanism 60 comprises a pair of fork arms 100 and 101 (FIGS. 3 and 4) each of which has a rubber pad 102 secured to its upper surface. The arms have upturned inner ends 100a and 101a respectively that are bolted, or otherwise secured, to two interconnected horizontal members 104 and 105 of a carrier 106. At each end the carrier 106 has a roller 107 (FIG. 4) disposed to ride on a face of the adjacent deep channel member 81, and a roller 108 riding on the edge of that channel. The carrier 106 has two rollers 112 and 113 at each end, each roller 112 being adapted to roll along an inner face of the adjacent channel 81 and each roller 113 adapted to ride on an edge of the channel.

The carrier and the attached fork arms are elevated by means of a double-acting power cylinder 120 (FIGS. 4 and 5) which is bolted at its lower end to a plate 119 carried by a fixed angle bar 85 of the frame and is secured, near its upper end, to a channel 86 of the frame by a strap 118. The power cylinder is provided with a piston rod 121 which carries a crosshead 122 on which two spaced sprockets 123 (FIG. 4) are rotatably mounted. Each of two chains 124 has an end portion 124a bolted to a flange 125 secured to a fixed frame channel 86 and is trained individually over one of the sprockets 123. The other end of each chain is secured to a tab 126 (FIG. 4) that projects rearwardly from an angle bar 127 which is bolted to the lower carrier member 105. With this arrangement, when fluid under pressure is directed to the lower end of the power cylinder 120, the crosshead 122 and the sprockets 123 are forced upwardly causing the chains 124 to elevate the fork arms. When the pressurized fluid is released from the lower end of the power cylinder, and fluid applied to the upper end of the cylinder, the fork is moved downwardly. The fluid released from the lower end of the cylinder provides a predetermined amount of resistance to the downward movement of the fork.

The horizontal boom 76 (FIG. 7) comprises a rigid frame 135 having interconnected upper and lower frame sections 136 and 137. The upper frame section includes two longitudinal angle bars 138 and 139 connected at one end of the frame by a transverse angle bar 140. Intermediate their length, the longitudinal members 138 and 139 are connected by a second transverse angle bar 141 and, at the other end, the members are connected to tabs 142 of a deep transverse angle bar 143. The lower frame section 137 includes two longitudinal angle members 150 and 151 which are connected at the outer end of the boom to vertical angles 149 and 152, respectively, depending from the ends of the members 138 and 139 of the upper frame and are secured, as by welding to the deep transverse angle bar 143 and to a second deep transverse angle bar 153.

A box-like guide track 154, which is mounted within the lower frame section 137, comprises two longitudinal channels 155 connected by a transverse angle bar 159. Adjacent the outer or free end of the boom 76, a power cylinder 170 (FIGS. 6 and 7) is anchored to an end plate 171 of a fixed longitudinally extending channel 178 whose legs project upwardly. The cylinder 170 has a piston rod 180 which carries a crosshead 181 on which four sprockets 182, 183, 194 and 185 (FIG. 7) are rotatably mounted. The crosshead 181 also is provided with two support rollers 186 and 187 which ride along the inner surface of the web of the central channel 178. Two chains 190 and 191 (FIG. 7) are secured at one end in short angle bars 192 and 193 each of which is secured between one upwardly projecting leg of the central channel 178 and the transverse angle bar 141 of the boom. The chains are trained around the sprockets 183 and 184, and each chain has its other end secured to a transverse member 200 of a horizontally reciprocable carriage 201 which rides in the guide frame 154 and on which the suction head 74 is mounted. The carriage 201 comprises two transverse angle bars 200 and 204, and two longitudinal angle bars 205 and 206, all suitably welded together to form a rigid unit. A second pair of chains 210 and 211, which are connected to the bar 204 of the carriage, are trained over the sprockets 182 and 185 on the crosshead and are secured to the fixed transverse member 143 of the boom. The suction head 74 comprises a pair of short channels 216 depending from the carriage members 205 and 206. A transverse angle 217 on which three suction cups 222 (FIG. 3) are mounted, is connected between the depending channels 216.

Three valve housings 218 (one only being shown in FIG. 6A) are mounted on the transverse angle 217. Each valve housing is associated with one of the suction cups 222 and is provided with a spring loaded valve element 219. When the cup engages an article, the element is moved inwardly to connect the cup to a manifold (not shown) through a conduit 220.

The power cylinder 170 is a standard double acting hydraulic cylinder having fluid connections (not shown) at each end 170A (FIG. 6) and 170B. When fluid under pressure is directed into the power cylinder at end 170B and end 170A is vented, the carriage 201 will be moved outwardly toward the free end of the boom 76 to carry the suction cups into contact with a transverse line of articles A of the uppermost layer of articles. Then, when end 170B of the cylinder is vented and fluid under pressure is directed to end 170A, the suction head is moved toward the right (FIG. 6) to carry the suction cups 222 and the cases gripped thereby to a position above the curved conveyor 78. A cam 224 (FIG. 9) which is carried by the end of the carriage, engages an actuator 225 of a valve 226 in the vacuum line to the suction cups. When the cam engages the actuator, the suction pressure to the cups will be interrupted and the cups will release the cases.

The carriage 201 carries a plurality of rollers 227 which engage surfaces of the guide frame 154 to guide the movements of the carriage 201 as it is reciprocated in the boom 76.

At certain times during a pallet unloading operation, it is necessary to raise the suction cups upwardly a short distance. This raising of the cups is carried out by a hydraulic power cylinder 230 (FIGS. 6 and 7) which is pivotally mounted on the transverse angle member 153 of the boom 76 and has a piston rod 231 pivotally connected to a pair of arms 232 on a shaft 233. At each end the shaft 233 is secured to two generally triangular pivot plates 236. A pair of rods 237 each of which is pivotally connected between a pair of plates 236, projects outwardly along the boom to a point where each rod is pivotally connected between another pair of generally triangular pivot plates 236. The pivot plates adjacent the outer end of the boom are welded to a second shaft 240. A short link 241, which is pivotally connected between each pair of plates 236, projects downwardly through a slot 242 in one of the longitudinal members of the lower frame section 137 and is welded to one of the longitudinal channel members 155 of the guide track 154. The cylinder 230 is double acting and, when fluid under pressure is directed into the cylinder adjacent its pivot end 230A, the piston rod 231 is forced out of the cylinder, causing the shaft 233 to rotate clockwise (FIG. 7). The four pairs of pivot plates 236 are also pivoted clockwise and the links 241 are raised, causing the suction cups to be raised for a purpose which will be explained hereinafter.

The boom 76 is mounted for vertical movement in the main frame of the machine by means of two cross-shaped plates 250 and 251 which are bolted to the members 150 and 151, respectively, of the lower frame section 137 of the boom. The cross-shaped members 250 and 251 have upper ends 250a and 251b welded between the transverse deep angle bars 143 and 153, and each member has four rollers 255 that ride along inner vertical faces of a leg of one of the deep channel members 81 of the main frame of the machine.

The boom 76 is raised by means of a double acting hydraulic power cylinder 260 (FIG. 6) that is mounted in fixed position on a rigid superstructure 259 mounted on the upper end of the main frame. The cylinder 260 has a piston rod 261 that carries a crosshead 262 on which two sprockets 263 and 264 (FIG. 8) are rotatably mounted. Two chains 270 are trained around the sprockets 263 and 264, and each chain has an end portion 270a secured to a fixed member of the superstructure. Each chain is trained around a rotatable idler sprocket 272 and has a vertical run with a lower end 270b secured to the deep transverse angle bar 143 (FIG. 7) of the boom. When fluid under pressure is directed to one end of the cylinder 260, the piston rod is moved outwardly of the cylinder, causing the chains to raise the boom 76. When the pressure is applied to the other end of the cylinder, the boom is moved downwardly by gravity with the fluid vented from the first end providing a predetermined amount of resistance to the downward movement.

The curved conveyor 78 is carried by the boom 76 and comprises two spaced, interconnected curved angle bars 280 and 281 (FIGS. 6 and 8), the bar 281 being bolted to a channel 282 extending between the two cross-shaped plates 250 and 251, and the bar 280 being supported from the deep angle bars 143 and 153 of the boom by a cross bar 283 (FIG. 8) and a vertical angle 284. The conveyor has a plurality of drive rollers 285 which are driven by a motor 286 (FIG. 6) through a chain and sprocket drive 287 which may include one or more sprockets keyed to each shaft and chains interconnecting the sprockets.

Electric power is supplied to the several motors of the machine by a series of trolleys 300 (FIGS. 8 and 9) which are mounted on the superstructure 259 and are adapted to contact power lines 301 (FIG. 9). The trolleys are electrically connected to conductors in a distribution box 302 which are connected to the motors. Pressurized fluid for the several hydraulic power cylinders is provided by a motor driven pump unit 303 mounted on the machine. A motor driven vacuum pump unit 304 is provided to supply air at sub-atmospheric pressure to the suction cups.

In order to assure that the machine is accurately aligned with the supply conveyor, as C, and the discharge conveyor, as C', at each transfer station, a centering unit 305 (FIG. 9) is fixed to the floor at each station. The unit 305 comprises a floor-mounted vertical plate 307, having inclined edges that define a socket having a V-shaped upper portion 308 and a straight lower channel 309. A roller 310 carried on the lower end of a slide block 312 is adapted to be guided down into the channel 309 to lock the machine against movement on the tracks during an unloading operation. The slide block 312 is disposed between two flanges 314 and 315 of a bracket 316 that is fixed to the frame 70 of the machine. The piston rod 317 of a double acting power cylinder 318 controls the vertical movement of the slide block 312 and the roller 310 carried thereby.

As previously mentioned, when a pallet P on the fork lift mechanism has been completely unloaded, the suction head 74 moves outwardly once more to push the empty pallet onto the pallet removal conveyor G (FIG. 2). For this purpose, a pusher plate 320 (FIGS. 10 and 11) is mounted by means of a pair of parallelogram linkages 321 that are pivotally carried by an inverted U-shaped bracket 322 bolted to the transverse angle 217 of the suction head. The pusher plate 320 is held in an elevated position during all of the article removing operations by springs 324 which assume an over-center position relative to pivot points of the linkages 321. When the pallet has been completely emptied, the fork arms are raised once more causing bolts 325 (FIGS. 10 and 13), that are adjustably mounted on the transverse carrier member 105 of the fork lift mechanism to be moved to a position wherein they will be engaged by rollers 326 (one only being shown in FIG. 10) on extended arms 327 of the parallelogram linkages, causing the arms 327 to be cammed upwardly and causing the pusher plate 320 to be lowered. The springs 324 move to another over-center position, locking the plate in its lowered position wherein its lower edge is aligned with the empty pallet P on the fork arms. Then, when the pusher is moved outwardly on the boom, as seen in FIG. 14, the pallet P is engaged by the pusher plate and moved onto the pallet removal conveyor.

After the pallet has been removed, the suction head is returned to its inner position causing the rollers 326 on the extended arms 327 to engage the lower, inclined camming surfaces of cam plates 329 (FIG. 10) that are mounted on the transverse channel 282 (FIG. 7) of the boom. With this arrangement the parallelogram linkages are returned to the position of FIG. 11 in which the pusher plate 320 is in its elevated position.

HYDRAULIC CONTROL SYSTEM

In FIGURE 15 is diagrammatically illustrated the hydraulic system that controls the raising and lowering of the fork lift mechanism 60, the raising and lowering of the centering roller 310, the reciprocating movement of the suction cup carriage 201, and the raising and lowering of the boom 76.

The hydraulic system includes the pump unit 303 arranged to take liquid from a reservoir 431, force it into a main pressure line 433 and through the system, and return it by way of a drain line 434 to the reservoir.

The fork lift unit 60 is raised and lowered by means of the power cylinder 120 which has the crosshead 122 at its upper end. To raise the fork arms, a solenoid SOL–3 is energized to shift a valve V3 toward the right (FIG. 15) to align a passage P1 in the valve with a conduit 436 extending from the main supply line 433 and with a conduit 437 that directs liquid into a line 438 of a counter-balance valve CB–1. The line 438 communicates with a conduit 439 that delivers pressurized fluid to the lower end of the power cylinder 120 to urge the piston in the cylinder in an upward direction to raise the fork arms. When the valve V3 is shifted to the right, the upper end of the power cylinder is connected to the reservoir 431 through a line 440, passage P2 in valve V3, and a line 442 that communicates with the drain line 434.

To lower the fork arms, the solenoid SOL–3 is deenergized and a solenoid SOL–4 is energized to shift valve V4 to the left (FIG. 15) to connect pressure line 436 with line 440 through valve passage P3 and to connect line 442, leading from drain line 434, with line 437 through passage P4. The piston in the cylinder is urged downwardly to build up pressure in line 439 and in counterbalance valve CB–1. When the pressure reaches a predetermined value, a passage P5 in valve CB–1 communicates with a passage P6 which is connected to line 437. With this arrangement, the fork arms are forced downwardly against a predetermined resistance and as a result the downward movement of the forks is under control.

The reciprocating movement of the carriage 201 along the boom is effected by means of the power cylinder 170. Just before the carriage starts its movement inwardly to draw a line of cartons onto the curved conveyor, the track in which the carriage rides is raised slightly to make sure that the leading edges of the cartons will not catch on cartons of the layer next below as they are dragged along. This slight upward movement of the carriage is accomplished by power cylinder 230.

In the position illustrated in FIG. 15, the suction cup carriage 201 is in the inner, raised position it assumes when it is releasing a line of cartons to the curved conveyor 78. To move the carriage out along the boom to engage the next line of cartons, a solenoid SOL–6 is energized to shift valve V6 toward the left (FIG. 15) to align a valve passage P7 with the main supply line 433 and with a line 444 that has two branches 444A and 444B leading respectively to a metering valve MV–1 and a sequence valve SV–1. The valve MV–1 directs fluid to a line 445 leading to the inner end of the power cylinder 230, causing the piston rod to be retracted into the cylinder to lower the guide track 154 in which the carriage rides.

After the carriage is lowered, the sequence valve SV–1 directs pressurized fluid through line 449 to end 170–B of the power cylinder, forcing the piston rod into the cylinder and moving the carriage outwardly along the boom, the other end 170A of the cylinder being suitably connected to the reservoir through valve passage P8. The line 449 has a branch 449A that is connected to the drain line 434 through a valve V–7 and a pressure reducing valve PR–1. Just as the suction cups approach a line of cases, a solenoid SOL–7 is energized, causing the valve V–7 to be shifted to the left to align valve passage P9 with the line 449A so that the last part of the outer stroke of the carriage is done at a greatly reduced pressure and, as a result, the suction cups engage the cartons with a gentle push.

After the suction cups have gripped the line of cartons, the solenoid SOL–6 is deenergized, permitting the valve V6 to be moved to the right (FIG. 15) by a spring 448 to align a passage P10 with the main supply line 433, and with a line 450 that has two branches 450A and 450B that are connected respectively to a metering valve MV–2 and to a sequence valve SV–2. The metering valve MV–2 directs fluid to the outer end of cylinder 230 to raise the guide track 154 in which the carriage rides. Then the sequence valve SV–2 directs fluid to the end 170A of cylinder 170 to cause the carriage to move inwardly along the boom, the cylinder end 170B being suitably vented through line 449.

The raising and lowering of the boom is controlled by valve V–5. When the boom is to be lowered, solenoid SOL–5 is energized, causing valve V5 to shift to the left to align a valve passage P11 with a line 455 leading from supply line 433 and with a line 456 leading to the inner end 260A of power cylinder 260. The boom is forced downwardly while the outer end 260B of the power cylinder is connected to the drain line 434 through a line 460, a counter-balance valve CB–2, a line 461, valve passage P12 and a line 462. Thus the boom is moved downwardly against a predetermined resistance provided by counter-balance valve CB–2.

To raise the boom, the solenoid SOL–5 is deenergized, causing a spring 465 to move the valve to the right to the illustrated position connecting a valve pasage P13 with line 455 leading to the main supply line and with line 461 which directs fluid through valve CB–2 to end 260B of the power cylinder 260. The boom is raised, while cylinder end 260A is connected to the drain line through valve passage P14.

The raising and lowering of the centering roller 310 is controlled by valves V1 and V2. When the depalletizer approaches the desired carton transfer station, a solenoid SOL–1 is energized to shift valve V1 to the right to align valve passage P15 with a line 470 leading to supply line 433 and with a line 471 leading to the upper end of the power cylinder 318. The centering roller is moved downwardly while the lower end of cylinder 318 is connected to the drain line 434 through a metering valve MV–3, a pressure reducing valve PR–2 and line 472.

To raise the centering roller, solenoid SOL–1 is deenergized and solenoid SOL–2 is energized, moving valve V2 to the left to connect valve passage P16 to line 470 and to line 473 which directs presurized fluid to the lower end of cylinder 318, the upper end of the cylinder being connected to the reservoir through a valve passage P17.

*Electrical control system*

*Switch location.*—A control console 350 (FIG. 16) is located in the processing plant adjacent the machine. A main disconnect switch SW-1 is mounted on the console, as are six stepping switch units SS1 through SS6. Each stepping switch has 4 levels, and each level is associated with a number of cases. The four levels of unit SS1 are associated with numbers 1, 2, 3 and 4; the levels of unit SS2 with numbers 5, 6, 7 and 8; the levels of unit SS3 with numbers 9, 10, 10 and 20; the levels of unit SS4 with numbers 30, 40, 50 and 60; the levels of units SS5 with numbers 70, 80, 90 and 100. One level of unit SS6 is a line selector level; another level is a home bank level; another level is a reset level, and the fourth is not used. The six stepping units are connected together so that their wipers move in unison and the units may be considered to constitute one stepping switch having 24 levels. Six lamps 351 are mounted on the console and are connected to the units in such a manner that all lamps will be lit when all units are synchronized.

A control panel 354 (FIG. 17) is mounted on an inclined deck 355 (FIG. 16) of the control console. Mounted on the panel 354 are 36 selector units 356, one of which is shown in FIG. 18. Also mounted on the panel is a main "on" control switch SW2, a depalletizer power switch SW4, and the push buttons of a reset switch RS and of a start switch STS.

Each selector unit 356 (FIG. 18) includes two dials, SSU for selecting from 1 to 9 cases and SST for selecting from 10 to 90 cases. A "run" or "hold" switch SW6 is mounted at the lower end of each selector unit.

A limit switch LSQ (FIG. 21) is mounted on the supply conveyor adjacent the end of one of the fork arms of the depalletizer. A switch actuator 360 (FIG. 19) has two arms 361 and 362, the arm 361 being arranged to overlie the fork arm so that, when the fork is raised, the arm 361 will be moved to actuate the switch LSQ whereby a power cylinder 364 of the linkage 62 locks a stop bar 365 in an up position so that the next loaded pallet on the supply conveyor cannot be moved toward the fork while cases are being removed from the pallet supported on the fork. When the fork is subsequently lowered, the switch actuator arm 362 will be contacted to actuate the switch and unlock the linkage 62.

A switch LSR is mounted at the outer end of the supply conveyor, and this switch is held closed by a pallet resting on the conveyor end. When the lowermost layer of cases has been removed from the pallet, the pallet is discharged onto the associated overhead take-away conveyor G before the fork is lowered. Accordingly, when an empty fork reaches its lowermost position and actuates switch LSQ to unlock the linkage 62, the switch LSR will not be actuated by a pallet and the power cylinder 364 will be energized to lower the stop bar 365 and permit a loaded pallet to move onto the end of the supply conveyor above the fork.

A plurality of switches LSG (FIG. 23) are mounted on the floor of the plant at equal intervals alongside the tracks T, one switch being associated with each case transfer station. One of these switches LSG is shown in FIG. 9 and comprises an actuator 370 arranged to be engaged by either of two arms 371 and 372 of the depalletizer frame, depending upon in which direction the machine is moving. When the machine comes to rest, the switch actuator 370 is held down by an arm 373 projecting from the slide 312.

Two toggle switches SW3 and SW5 (FIG. 22) are mounted on a control box 374 mounted on the depalletizer.

Two switches LS2 and LS3 (FIGS. 21 and 23) are mounted on the frame of the machine in a position to be actuated by the fork.

A switch LS4 (FIGS. 21 and 22) is mounted on the frame in a position to be actuated by the fork in its lower position.

A switch having two sets of contacts LS5 and LS5-A (FIG. 23) is mounted on the machine frame and has an actuator 375 arranged to be engaged by a camming plate 376 mounted on the slide 312. The switch is so arranged that, when the roller 310 of the centering unit is in its upper position, contacts LS5-A are closed and, when the centering roller is in its lower position, contacts LS5 are closed.

A switch LS6 (FIG. 23) is also mounted on the frame in a position to be actuated by the boom when it is in its lowered position.

Switch LS7 (FIG. 23) is mounted on the frame in position to be actuated by the boom in its upper position.

Switch LS9, which has two contacts LS9-1 and LS9-2, is mounted on the outer end of the boom as seen in FIGURE 21 and has an actuator 378 arranged to be engaged by one of the cases in the uppermost layer of cases on the fork. When the case engages the actuator, contact LS9-1 is closed and contact LS9-2 is opened.

A photoelectric relay is mounted across the upper end of the boom above the actuator 378 of switch LS9 and comprises three laterally spaced lamps 380 (FIG. 21) on the outer end of the boom and three receivers 381 (FIG. 23) on the frame.

A switch LS9-A (FIGS. 21 and 23) is mounted on the frame in position to be actuated by the boom.

A switch LS10 (FIG. 21) is mounted on the frame and is actuated by the fork in its extreme upper position.

A switch LS11 (FIG. 6) is mounted on the suction carriage and has an actuator 385 arranged to be closed by the articles engaged by the suction cups.

A switch LS12 is mounted on the lower end of the machine frame at the right side as seen in FIG. 22. When the machine reaches the right end of the tracks on which it runs, the actuator 384 of the switch LS12 is engaged by a fixed actuator 382 (FIG. 21) on the floor to effect the reversal of the machine.

A switch LS13 (FIG. 22) is mounted on the lower left side of the machine and is arranged to be actuated by a fixed floor-mounted abutment at the left end of the tracks. When the switch LS13 is actuated, the movement of the machine toward the left is stopped and its starts back toward the right.

A switch LS18 (FIG. 23) is mounted on the frame in a position to be closed by the suction cup carriage at the end of its movement inwardly along the boom.

A switch LS19 (FIG. 23) is mounted on the frame in a position to be closed by the boom in its upper position.

A switch LS20 (FIG. 21) is mounted at the rear of the frame and is closed by the fork in its lowest position.

Two demand switches LSF (FIG. 21) are mounted at the discharge end of each of the upper and lower order picking conveyors. The switches are normally held open by cases resting on the conveyors. However, when the number of cases on one of the conveyors gets below a predetermined minimum, the switches LSF will be uncovered and allowed to close thus indicating that the depalletizer should transfer cases onto that conveyor.

A switch LS1 (FIG. 20), mounted at the outer end of each order picking conveyor, is held closed by a case on the end of the conveyor.

A switch LS1A is mounted on the frame of each truck loading conveyor opposite the discharge end of each order picking conveyor. A case being discharged from the order picking conveyor engages and closes the switch LS1A.

Three switches LS21 (FIG. 22) are mounted on the curved conveyor 78. These switches are held open by cases being discharged from the conveyor. In order that the depalletizer will not be moved while there is a case still on the conveyor, these switches are connected in the circuit of the solenoid that raises the centering unit. If a box holds any one of these three switches open, the roller of the centering unit will not be raised and the depalletizer will remain at the particular case transfer station.

*Control circuits.*—The control circuits will be explained with particular reference to diagrammatic FIGURES 24, 25 and 26, and the various elements of the circuit will be located by referring to transverse lines of the diagrams. To prepare the machine for operation the main disconnect switch SW1 mounted on the console and located in line 1 (FIG. 24), the auxiliary switch SW2 mounted on the selector unit 354 and located in line 95 (FIG. 26), and a manual toggle switch SW3 in line 4 on the depalletizer are manually closed. The main switch SW1, which may be located on a control panel near the machine, supplies 480 volt A.C. current from a suitable source to power lines L3A and L2A which are connected to a transformer 400 in line 94A. The transformer provides 117 volt A.C. current across conductors L2B and L3B and across conductors L1B and L3B. A 48 volt D.C. current is provided between conductors L2C and L3C through a resistor 402 and a rectifier 413, and a 24 volt A.C. current is provided across conductors L2D and L3D by means of a transformer 405. Then a switch SW4 on the depalletizer is closed to energize relay P in line 96, causing contacts P1, P2 and P3 in lines 1, 2 and 3, respectively to close, simultaneously energizing conductors L1E, L2E and L3E, which are in the circuits of the traction motor 95, the circuit of the motor of the hydraulic pump unit 303, the circuit of the motor of the vacuum pump unit 304, and in the circuit of the conveyor motor 286.

A transformer 406 in line 11, which is connected to power lines L2E and L3E, provides 117 v. A.C. across power lines L2F and L3F when the contacts of toggle switch SW5 in line 10 are closed.

As soon as current is supplied to power lines L2F and L3F, relay Q3 in line 44 is energized, closing contacts Q3-1 in conductors L1E, L2E and L3E, respectively. Thus the motor of the hydraulic pump unit 303 is immediately energized and pressure of approximately 700 p.s.i. is built up in the hydraulic system.

An operation selector control switch CS1 in line 91 of a control unit 408 is thrown to bridge contacts CS1-1 and CS1-2 to set the depalletizer for automatic operation and cause contactors CS1-3 in line 35 and CS1-4 in line 36 to be moved to closed position, energizing either relay Q1 or Q2 depending upon whether relay contact K-1 in line 36 or contact K-2 of line 38 is closed at that time. This circuit is completed through closed switches LS5-A in line 35 which is closed when the centering roller is in its upper position, and through switches LS18, LS19, and LS20 in line 33. Assuming that the depalletizer is prepared to move in the forward direction, indicated by arrow A in FIG. 1, the contact K-1 in line 36 will be closed. When relay Q1 is energized, contacts Q1-1 in lines 7, 8 and 9, respectively, are closed to energize the main traction motor coils, and contact Q1-4 in line 42 is closed to energize relay B in line 43. A contact B-1 in line 40 closes to energize a motor brake coil MBC in line 41 which receives 480 volt A.C. current from power lines L2G and L3G across the primary windings of transformer 406 in line 11. When this coil is energized, the brakes are released and the depalletizer starts to move in the forward direction along its tracks.

As the depalletizer advances, it contacts and closes the floor mounted switches LSG one after the other until it finds one of these switches whose control circuit has been prepared by the closing of the two demand switches LSE in line 27 on the associated discharge conveyor C', D', E', or F' (FIG. 1). The control circuit of the upper and lower discharge conveyors at one case transfer station only will be illustrated, it being understood that each upper and lower conveyor has such a control circuit and that each circuit has a switch unit 412, lines 27 and 29.

Contacts 412A and 412B of each unit 412 are connected in series with contacts 412A and 412B of every other unit through a manual switch which has two ganged contactors SW6-1 and SW6-2. When the contactors of this switch are in the illustrated "run" position, the control circuits of all the discharge conveyors are connected in series. When the contactors of any one unit 412 are moved to the "hold" position (indicated in phantom line), only the control circuit of that one unit is connected across conductors L2F and L3F, the control circuit of all other conveyors being disconnected by the actuated contactor SW6-1. For the purpose of the present discussion of an automatic cycle of operation it will be assumed that all switch contactors SW6-1 are in the "run" position.

*Upper level operation.*—When the depalletizer finds the control circuit of a floor switch LSG in which demand switches LSE of an upper order picking conveyor are closed, the circuit will be energized from conductor L2F through closed relay contact WW-1 in line 17A, closed time relay contact Y-1 in line 18, warm-up relay contact WU-1, a closed relay contact XX-1, a contact S-1 of a safety relay S, trolley TR, switch contactors SW6-1 and SW6-2 of units 412, demand switches LSE, the floor mounted switch LSG and the closed contact of the supply conveyor switch LSR. When the control circuit is closed, relay CR1 in line 27 is energized, closing contacts CR1-1 in line 22-23 and energizing relays X, X3, and D through trolley TR-1 and a selector switch contact CS1-5 in line 24 that was closed when the machine was put on automatic.

When relay D is energized, contact D-1 in line 36 is opened, deenergizing relay Q1 and causing contacts Q1-1 in lines 7, 8 and 9 to open and deenergize the main traction motor 95. Also, when relay Q1 is deenergized, contact Q1-4 in line 42 is opened to deenergize relay B to open contact B-1 in line 40 to deenergize the motor brake coil MBC, allowing the brakes to be applied mechanically to stop the forward movement of the depalletizer.

Approximately 4.5 seconds after relay X is energized, a contact X-4 in line 53 closes to energize relay F in line 67 and to energize the solenoid SOL-1 which shifts valve V1 in a direction to start the downward movement of the roller 310 of the centering unit 305. At about the time that the roller 310 starts its centering action, a time delay contact F-2 in line 42 closes to energize the coil MBC to release the brakes and permit the necessary shifting of the depalletizer during the centering operation. Also, when relay F is energized, a contact F-3 in line 45 closes, energizing relays Q4 and Q5 and closing relay contacts Q4-1, and relay contacts Q5-1 in conductors L1E, L2E and L3E, whereby the motor of the vacuum pump unit 304 and the motor 286 of the conveyor 78 are activated. Contact Q5-2 in line 46 closes to seal in relays Q4 and Q5.

As the roller 310 of the centering unit approaches its lowermost position, it closes switch LS5 in line 66, energizing solenoid SOL-3 of valve V3 causing the fork to be moved upwardly. As the fork moves upwardly, a case in the uppermost layer of cases on the fork contacts and closes switch LS9-1 in line 61 to energize relay HH. Contact HH-1 in line 76 closes to energize the boom relay H, causing H-1 contact in line 66 to open, interrupting the power to solenoid SOL-3 of valve V3. At the same time, contact H-2 in line 72 closes, energizing solenoid SOL-6 of valve V6 and causing the suction carriage to move out along the boom toward the first line of cases on the pallet. The carriage switch LS11 in line 85 contacts the first line of cases and is closed, energizing relay A, the carriage relay, and energizing the solenoid SOL-7 of valve V7.

When relay A is energized, contact A-1 in line 72 opens to deenergize the solenoid SOL-6 of valve V6, causing the suction carriage to be moved inwardly of the boom to draw the first line of cases to a position above the curved conveyor 78. Also contact A–4 in line 80 closes to keep relay H energized. When the cases are above the curved conveyor 78, the cam 224 on the frame of the machine actuates valve 226 (FIG. 9), to shut off the suction to the suction cups. The first line of cases is then released onto the curved conveyor 78 and is discharged onto the order picking conveyor. The switch LS11 in line 85 is opened as the cases leave the suction cups and thus relay A in line 87 is deenergized. Contact A–1 in line 72 returns to its closed position to energize the solenoid SOL–6 of valve V6 and causes the suction carriage to move out along the boom toward the second line of cases on the pallet. The switch LS11 is again closed by the cases, whereby relay A is again energized to cause the carriage to draw the second line of cases to a position above the curved conveyor 78. Thus, the suction head reciprocates back and forth over the fork to successively draw the lines of cases to a discharge position above the curved conveyor 78. When the last line of cases of each layer, except the lowest layer, is removed, a switch LS9–2 in line 69 is closed energizing relay G through closed contact T–1, contact R–1, switch LS9–2, switch LS5 and contact X–4 in line 53. A contact G–1 in line 66 opens to block out solenoid SOL–3 of valve V3 which was previously deenergized by the opening of contact H–1.

Contact G–5 in line 71 closes to energize relay GG through closed switch LS7. Relay contact GG–1 in line 63 opens to further lock the solenoid SOL–3 of valve V3 from the other side of the line. A contact GG–2 in line 73 locks relay GG in. The closing of switch LS9–2 in line 69 also energizes relay W in line 75 causing contact W–1 in line 83 to close and energize relay WW which is locked in through contact WW–2 in line 81. Contact WW–1 in line 17A opens to deenergize relay X in line 21 stopping the cycle. Contact W–2 in line 81 is timed to open to deenergize relay WW.

When relay X is deenergized, contact X–3 in line 54 closes. Since contact N–1 in line 55 is closed at this time, the solenoid of valve V2 is energized causing the centering roller to be lifted to release the depalletizer and permit it to move along the track. Closing of contact X–3 also causes the energizing of the solenoid of valve V4, whereby the fork is lowered thus completing a cycle of unloading of a layer of cases from a pallet.

When relay D is deenergized, contact D–1 in line 36 closes again to energize the relay Q1 and cause the depalletizer to resume its forward movement along the tracks. If the depalletizer finds another switch LSG that is in a circuit prepared by the opening of demand switches LSE, it will stop at this station and go through its unloading operation until the topmost layer has been removed from the pallet and discharged onto the order picking conveyor associated with that station.

The depalletizer will continue in its forward movement until it reaches the end of its forward run where the actuator 384 of switch LS12 in line 17 contacts the cam 382 alongside the track and is closed. When switch LS12 is closed, relay L is energized, causing a contact L–1 in line 15A to close and thereby energize relay K. When relay K is energized, contact K–1 in line 36 will be opened, and contact K–2 in line 38 will be closed, whereby the relay Q1 will be deenergized and the relay Q2, associated with the reversing coils of the traction motor, will be energized. With this arrangement, the forward movement of the depalletizer is stopped and it starts its rearward movement. It will be evident, of course, that when the depalletizer reaches the end of its rearward movement, the switch LS13 in line 17 will be opened to deenergize relays K and L and cause the reversing relay Q2 to be deenergized.

*Lower level operation.*—If the depalletizer contacts a floor switch LSG associated with a case transfer station at which the demand switches LSF in line 29 of a lower order picking conveyor have closed due to a deficiency in the number of cartons thereon, relay CR2 in line 29 will be energized. The relays X and D in lines 21 and 22 respectively, will be energized to successively deenergize the coils of the main traction motor, apply the brakes to stop the depalletizer, move the roller 310 of the centering unit downwardly to center the depalletizer, and release the brake to permit the centering action.

When relay CR2 is energized, a contact CR2–1 in line 19 is closed to energize relay C. Contact C–1 in line 66 opens and contact C–2 in line 69 closes. Then, when the centering roller closes switch LS5 in line 66, the solenoid SOL–5 associated with valve V5 in line 69 is energized causing the boom to be lowered approximately 18 inches to its lower position in which the curved conveyor 78 is adapted to deliver cases to a lower, order picking conveyor.

When the boom approaches its lower position it closes switch LS6 in line 64, causing the solenoid SOL–3 of valve V3 to be energized and shift the valve in a direction to raise the fork. During the upward movement of the fork, a case in the upper layer of cases closes switch LS9–1 in line 61 to start the unloading of cases onto the lower level of the order picking conveyor.

*Empty pallet discharge.*—After the last line of cases of the lowermost layer has been removed from the pallet on the fork arms, the pallet is pushed off the fork arms onto the pallet removal conveyor G at that station. Assume the condition in which the depalletizer is transferring cartons to a lower, order picking conveyor and the suction carriage is now moving outwardly along the boom toward the last line of cartons.

When the suction cups engage the cartons, switch LS11 in line 85 is closed to energize relay A, open the contact A–1 in line 72 and deenergize solenoid SOL–6 of valve V6. The carriage is moved inwardly to discharge the cartons, causing switch LS9–2 in line 69 to close. Switch LS2 which has contacts in lines 71 and 79 is actuated by the boom when the forks are in this upper case position. Contact LS2–1 in line 79 is closed and relay Z in line 78 is energized, causing time delay contact Z–1 in line 51 to close and energize relays J and Y. Contact Z–2 in line 77 opens to deenergize relay R. Contact R–1 in line 75 closes to energize relay G, and close contact G–5 in line 71. Relay GG in line 73 is energized, causing contact GG–1 in line 63 to open to lock the fork. Contact J–1 in line 64 closes, and Y–2 contact in line 19 closes to bridge contact WW–1 in line 17A, thus keeping the circuit energized. Contact Y–3 in line 69 opens to deenergize the solenoid of valve V5 causing the boom to be raised.

When the boom reaches its upper position, it opens switch LS7 in line 73, deenergizing relay GG, and closing contact GG–1 in line 63 to energize the solenoid of valve V3. The fork arms are raised until they close switch LS10 in line 84 to energize relay I, close contact I–2 in line 78, and energize relay H. Contact H–2 in line 72 closes and contact I–3 in line 71 closes to energize the solenoid of valve V6 to lower the carriage track in the boom and move the carriage out along the boom. The pallet pusher plate 320 on the carriage is cammed downwardly to engage the pallet and push it onto the adjacent pallet removal conveyor. Time delay contact Y–1 in line 18 is automatically opened after a predetermined time to stop the cycle.

If the depalletizer approaches a case transfer station where both the upper and the lower order picking conveyors are calling for cases, the lower conveyor will be filled first due to the fact that the C relay in line 18 will be energized.

If it is necessary to keep the depalletizer at one case transfer station to continuously transfer a large number of cases to a particular order picking conveyor, the unit 412 associated with that conveyor, such as the switch in line 27, are moved to "hold" position. In this manner the control circuit of all of the other order picking conveyors is disconnected from the power lines. Then switch contactor CS1 in line 92 is moved away from the "automatic" position to the illustrated "off" position, deenergizing relay N. Contact N–1 in line 55 opens to lock out the solenoid SOL–2 to keep the centering roller in its lower position so that the depalletizer cannot move. Contact N–2 in line 35 opens to deenergize both coils of the main traction motor. With this arrangement the depalletizer cannot move from the selected transfer station.

*Order picking control circuit.*—Assume that there are four order picking conveyors #1, #2, #3 and #4, and that it is desired to fill an order requiring that 6 cases be discharged from conveyor #2 and 14 cases from conveyor #4. The units selector switch associated with conveyor #2 is indicated by reference letters SSU–2 in line 102 (FIG. 26) and the tens selector switch is indicated by letters SST–2. These selector switches are in series with one level CU–2 of a multi-level units counter CU, one level CT–2 of a tens counter, and with a dial ST–A indicating the positions of the wipers of the units levels of the stepping switch, and a dial ST–B indicating the wiper position of the tens levels of the stepping switch. Similarly, in line 103 a unit selector switch SSU–4 associated with order conveyor #4, a tens selector switch SST–4 associated with conveyor #4, one level CU–4 of the units counter CU, and level CT–4 of the tens counter CT are connected in series with unit stepping dial ST–A and tens stepping dial ST–B. The switches and counters associated with conveyors #1 and #3 are identical and will not be illustrated.

To set the machine to automatically fill the order, the number "6" is dialed on units selector SSU–2 associated with conveyor #2, the number "4" is dialed on units selector SSU–4 and the number 10 is dialed on tens selector SST–4. A reset button RS–1 in line 101 is contacted to close its contacts RS–2 in line 120. A relay CR in line 120 is energized, closing contact CR–1 in line 122, locking relay CR in through a closed, off-normal contact OFN of the stepping switch. A contact CR–2 in line 118 closes to connect power line L2C to a zero contact of the home level SS–HL of the stepping switch. Current is applied through a wiper arm 490 to a pulsing relay PV in line 114 through a closed relay contact PV–1. When relay PV is energized, contact PV–1 opens and contact PV–2 in line 111 closes to energize coil 491 in line 118 which cocks a spring in the stepping switch. The opening of contact PV–1 opens the energizing circuit of relay PV, but a condenser 492 in line 112 discharges to keep the relay energized for a predetermined interval.

When relay PV is deenergized, contact PV–2 opens to deenergize the coil 491, permitting the cocked spring to move the wiper arm 490 from the zero contact to the "1" contact of the home level of the stepping switch.

A start button SB in line 101 is momentarily closed to energize relay 1CR and close contact 1CR–1 in line 100 whereby power is supplied to line L2C–A. When the selector switch SSU–2 was actuated, a contact SSU–2A in line 108 was opened and a contact SSU–2B in line 109 was closed. Similarly, when selector switch SSU–4 was actuated, a contact SSU–4A in line 114 was opened and a contact SSU–4B in line 112 was closed. The contact SSU–1A in line 104 associated with the unactuated selector switch of conveyor #1 was left in closed condition, as was the contact SSU–3A in line 112 of the unactuated selector switch of conveyor #3.

When the wiper bar 490 makes contact with the "1" contact of the stepping switch, the pulsing relay PV is again energized, causing the coil 491 to cock the wiper arm spring and, as soon as the relay is deenergized, the wiper arm is moved to contact "2" of the stepping switch.

Since contact SSU–2A is open, the pulsing relay will stop and, at this point, the wipers of units stepper ST–A and ST–B in line 102 have been stepped to the "2" position, indicating that the #2 conveyor is being loaded. Also the wiper of the line selecting level LSL–SS of the stepping switch in line 108 is at the "2" position.

When contact SSU–2B in line 109 was closed by the actuation of the selector switch of order conveyor #2, a relay X2CR in line 109 was energized due to the fact that the first case on the conveyor is holding switch LS1–1 closed. Contact X2CR–3 in line 116 closes, energizing solenoid SOL–15 which elevates the end of the conveyor and dumps the case onto the truck loading conveyor. Contact X2CR–1 in line 130 closes to flex a spring in counter CU in line 126. As the case drops onto the loading conveyor, it contacts and opens switch LS1A in line 109, deenergizing relay X2CR and causing the conveyor end portion to be lowered, and also causing the flexed spring to step the wiper of the counter CU–2 in line 102 from "0" to "1."

When the next case closes switch LS1—1 in line 108, the relay X2CR is again energized, the conveyor end is elevated to dump the case, the spring in the counter is flexed, the relay X2CR is deenergized, the conveyor end is lowered, and the wiper of the counter level CU–2 is moved to the "2" position. The conveyor continues to discharge cases until the wiper of the counter level CU–2 reaches the "6" position. At this point the circuit of line 102 has been closed through the units selector SSU–2 which was set at "6," the units stepper ST–A which is at the "2" position, the units counter CU–2 which is at the "6" position, the unactuated tens counter CT–2 which is at a zero position, the tens stepper ST–B which is at the "2" position and the unactuated tens selector SST–2 which is at the zero position.

A relay A2CR in line 102 is energized and locked in through relay contact A2CR–5 in line 102A, opening contact A2CR–3 in line 109 to stop the discharge of cases from conveyor #2. A contact A2CR–4 in line 127 closes to energize relay 11CR in line 133. Units counter CU will be stepped home through a closed off normal contact CU–ON. Similarly, if the tens counter CT in line 131 had been used, it would be stepped home through a closed off-normal contact CT–ON in line 134.

When the discharge of cases from conveyor #2 has been completed and relay A2CR has been energized, a contact A2CR–1 in line 110 is closed to start the pulsing relay PV again. The wiper of the stepping switch again hunts until it finds the open contact SSU–4A in line 114 of the selector switch associated with the #4 conveyor. At this time the wiper of the line selecting level LSL–SS in line 108 of the stepping switch will be at the "4" position. Accordingly, cases will be discharged from the #4 conveyor through the successive energizing of solenoid SOL–16 in line 119.

The 14 cases will be discharged from the #4 conveyor and will be counted exactly as explained in connection with the #2 conveyor. However, since the number of cases to be discharged is more than 10, the units counter CU–4 will count up to 10 and will then move the tens counter CT–4 to the "1" position. Then when the units counter reaches the "4" position again, the circuit of line 103 will be closed and the discharging of cases from conveyor #4 will stop.

It will be noted that three safety switches SAFETY LS1, SAFETY LS2, and SAFETY LS3 are connected in lines 48, 49 and 50, respectively. Switch SAFETY LS1 is positioned on the outer end of the boom and is provided with an actuator that projects downwardly to detect a loss of gap between the cases on consecutive loaded pallets on a supply conveyor. Switches SAFETY LS2 and LS3 are mounted on each side of the machine so that one of them moves ahead of the machine to contact any stacks of cases on the supply conveyors that are leaning into the path of movement of the machine. When either of these three safety switches are closed, relay S will be energized and the machine will be shut down through the opening of relay S contacts in the control circuits.

In lines 80, 81 and 82 are three contacts LS21–1 of switches LS21 on line 55. Contacts LS21–1 are closed when switches LS21 are opened.

A relay 8CR in line 123 has a contact 8CR–1 in line 114 for the purpose of isolating the pulsing circuit and permitting the switches to be stepped back to zero at the end of a counting operation. Stepping banks CU–1 and CT–1, which are associated respectively with counters CU and CT, are connected in the circuit of relay 8CR. When the counters are not operating the wipers of these banks are on the 11 contact. At all other times they close the circuit of relay 8CR. When either counter records the tenth case discharged, the associated wiper is spring urged to the 11 contact. When both wipers are on their 11 contacts, relay 8CR will be deenergized.

A zero push button is connected in lines 137 and 138 to permit the counters to be reset to zero when necessary.

From the foregoing description it will be evident that the present invention provides a complete efficient order picking system which is capable not only of automatically filling an order consisting of articles of different grades or classes but also is capable of automatically replenishing the system as orders are filled. The controlled sequential discharge of articles from the order picking conveyors is made possible by the efficient stepping switch control circuit of the present invention, and the automatic replenishing of the order picking conveyors is due to the improved depalletizer which is capable of patrolling the lane between the supply conveyors and the order picking conveyors.

While a depalletizer capable of discharging at two levels has been described, it will be understood that it is within the scope of the present invention to provide a depalletizer capable of discharging at more than two elevations to accommodate a plurality of superimposed order picking conveyors.

It will be understood that modifications and variations may be made without departing from the scope of the novel concepts of the present invention.

Having thus described my invention, what I claim as new and desire to protect by Letters Patent is:

1. In a depalletizer, a rigid support structure, a horizontal boom carried by said structure, a guide track mounted in said boom, a carriage mounted for reciprocating movement in said guide track, means defining slots in an upper wall of said boom, a plurality of arms projecting upwardly from said guide track through the slots in said boom, a linkage mounted on said boom and connected to said upwardly projecting arms and arranged when actuated to lift said guide frame upwardly relative to said boom, and a power cylinder mounted on said support structure having a piston rod operatively connected to said linkage to actuate the same.

2. In a depalletizer, a support structure, a horizontal boom on said structure, a carriage movable outwardly along said boom, a lifting member mounted in said structure for vertical movement and arranged to raise a pallet to a predetermined elevation, a pusher pivotally mounted on said carriage for movement from an upper position at an elevation above the predetermined elevation of the pallet to a lower position at said predetermined elevation, means for holding said pusher in said upper position, abutment means on said lifting member disposed in the path of said pusher as said carriage moves outwardly along said boom with said pusher in said upper position, and means for moving said carriage outwardly along said boom causing said pusher to engage said abutment means and be moved to the lower position for engaging the pallet and pushing it off said lifting member.

3. In an apparatus for handling a pallet loaded with articles including a foundation providing a substantially horizontal support surface, a track mounted on said foundation and having opposite sides, a lower horizontal supply conveyor supported on said foundation on one side of said track having a discharge end portion projecting toward said track and spaced upwardly from said surface, an upper pallet removal conveyor mounted on said foundation directly over and vertically spaced from said supply conveyor, and a discharge conveyor mounted on said foundation on the opposite side of the track from said supply and removal conveyors and having a receiving end portion projecting toward said track and being spaced above the discharge end portion of said supply conveyor, all of said conveyors defining a predetermined depalletizing station along said track, the combination of a vehicle mounted on said track for movement therealong, a boom projecting outwardly from said vehicle on the side of the track on which said removal conveyor is located and being above the level of the receiving end portion of said removal conveyor, a transfer conveyor supported on said boom having an inner end under the boom and an opposite outer end projecting toward the side of the track on which said discharge conveyor is located, said outer end of the transfer conveyor being at substantially the same elevation above said surface as the receiving end portion of said discharge conveyor, a lift mounted on said vehicle below said boom for elevational reciprocal movement between a pallet receiving position below the level of the discharge end portion of the supply conveyor and a pallet unloading position adjacent to said boom, a carriage supported on said boom for reciprocal movement therealong between a releasing position over said inner end of the transfer conveyor and an opposite pickup position spaced outwardly along said boom, means borne by said carriage for gripping articles on a pallet supported on said lift when said carriage is in said pickup position and for releasing said artcles onto said transfer conveyor when said carriage is in said releasing position, means on said carriage for engaging an empty pallet on said lift and for moving such a pallet onto said removal conveyor during movement of said carriage from its releasing position to its pickup position and after all of the articles on said pallet have been removed by said gripping means, powered means connected to said vehicle for moving the same along said track past said depalletizing station, and control means on said foundation and said vehicle for stopping said vehicle at said depalletizing station so that the outer end of said transfer conveyor is in juxtaposition to the receiving end portion of said discharge conveyor and so that a common vertical plane passes through said supply and removal conveyors, said lift and said boom.

4. A depalletizer comprising support structure, means mounting said structure for earth traversing movement, a substantially horizontal boom, means mounting said boom on said structure for elevational movement thereon, said boom having an inner end adjacent to said structure and an outer end projecting outward therefrom, a transfer conveyor supported by said boom adjacent to its inner end, pallet lifting means mounted in said structure for elevational reciprocating movement below said boom and said conveyor and adapted to raise articles on a pallet into engagement with said boom, and article gripping carriage means mounted on and under said boom but above said lifting means for horizontal reciprocating movement between a position adjacent to the outer end of said boom for gripping engagement with articles on said lifting means and an inner position over said transfer conveyor for discharging gripped articles thereon.

References Cited by the Examiner
UNITED STATES PATENTS

| | | | |
|---|---|---|---|
| 495,164 | 4/93 | Bessing | 214—16.42 |
| 1,768,360 | 6/30 | Jenney. | |
| 1,904,720 | 4/33 | Douglass | 214—309 |
| 1,907,458 | 5/33 | Stevenson | 214—306 |
| 2,019,182 | 10/35 | Gipe | 214—16.18 X |

(Other references on following page)

UNITED STATES PATENTS

| Number | Date | Name | Class |
|---|---|---|---|
| 2,096,958 | 10/37 | Clerc | 214—38.22 X |
| 2,124,444 | 7/38 | Boumans et al. | |
| 2,253,283 | 8/41 | Minaker | 214—309 |
| 2,459,204 | 1/49 | Van Vleck | 214—306 |
| 2,466,693 | 4/49 | Fisher | 214—309 |
| 2,467,493 | 4/49 | Pabich | 214—8.5 X |
| 2,525,572 | 10/50 | Woody. | |
| 2,609,947 | 9/52 | Couchman et al. | |
| 2,619,237 | 11/52 | Socke. | |
| 2,628,732 | 2/53 | Griswold | 214—309 |
| 2,652,931 | 9/53 | Hughes. | |
| 2,708,046 | 5/55 | Cushman. | |
| 2,714,456 | 8/55 | Manaugh. | |
| 2,727,642 | 12/55 | Haycock | 214—309 |
| 2,729,344 | 1/56 | Birchall. | |
| 2,763,390 | 9/56 | Vandemark | 214—653 |
| 2,765,928 | 10/56 | Riemenschneider | 214—16.62 X |
| 2,765,931 | 10/56 | Kraus et al. | 214—8.5 |
| 2,767,863 | 10/56 | Botley | 214—8.5 X |
| 2,768,756 | 10/56 | Horman | 214—514 X |
| 2,774,489 | 12/56 | Guigas. | |
| 2,823,809 | 2/58 | May. | |
| 2,899,088 | 8/59 | Corbin | 214—651 X |

HUGO O. SCHULZ, *Primary Examiner.*

ERNEST A. FALLER, JR., MORRIS TEMIN,
*Examiners.*